US011950020B2

(12) United States Patent
Raethke et al.

(10) Patent No.: US 11,950,020 B2
(45) Date of Patent: Apr. 2, 2024

(54) METHODS AND APPARATUS FOR DISPLAYING, COMPRESSING AND/OR INDEXING INFORMATION RELATING TO A MEETING

(71) Applicant: PINCH LABS PTY LTD, Fortitude Valley (AU)

(72) Inventors: Christopher Raethke, Camp Mountain (AU); Saxon Fletcher, Wurtulla (AU); Jaco Du Plessis, Ashgrove (AU); Andrew Cupper, New Farm (AU); Iain McCowan, Ashmore (AU)

(73) Assignee: Pinch Labs Pty Ltd, Queensland (AU)

( * ) Notice: Subject to any disclaimer, the term of this patent is extended or adjusted under 35 U.S.C. 154(b) by 0 days.

(21) Appl. No.: 17/602,821

(22) PCT Filed: Apr. 9, 2020

(86) PCT No.: PCT/AU2020/000029
§ 371 (c)(1),
(2) Date: Oct. 11, 2021

(87) PCT Pub. No.: WO2020/206487
PCT Pub. Date: Oct. 15, 2020

(65) Prior Publication Data
US 2022/0157058 A1 May 19, 2022

(30) Foreign Application Priority Data

Apr. 12, 2019 (AU) .................................. 2019901276

(51) Int. Cl.
*G06V 20/40* (2022.01)
*G06V 10/44* (2022.01)
(Continued)

(52) U.S. Cl.
CPC ............ *H04N 7/155* (2013.01); *G06V 10/454* (2022.01); *G06V 10/80* (2022.01); *G06V 10/811* (2022.01);
(Continued)

(58) Field of Classification Search
CPC ...... G06V 20/44; G06V 10/85; G06V 10/811; H04L 12/1831
See application file for complete search history.

(56) References Cited

U.S. PATENT DOCUMENTS 5,717,879 A   2/1998  Moran et al.
7,466,334 B1 * 12/2008  Baba .................... G11B 27/034
                                                       348/E7.083
(Continued)

FOREIGN PATENT DOCUMENTS

KR    10-2018-0127020    * 11/2018 ............. G10L 15/18
WO        201903296 A1     2/2019

OTHER PUBLICATIONS

International Search Report for PCT/AU2020/000029 dated Jul. 14, 2020.

*Primary Examiner* — David F Dunphy
(74) *Attorney, Agent, or Firm* — Potomac Law Group, PLLC; Joseph F. Murphy

(57) ABSTRACT

A method of visualising a meeting between one or more participants on a display includes, in an electronic processing device, the steps of: determining a plurality of signals, each of the plurality of signals being at least partially indicative of the meeting; generating a plurality of features using the plurality of signals, the features being at least partially indicative of the signals; generating at least one of: at least one phase indicator associated with the plurality of features, the at least one phase indicator being indicative of a temporal segmentation of at least part of the meeting; and at least one event indicator associated with the plurality of (Continued)

features, the at least one event indicator being indicative of an event during the meeting. The method also includes the step of causing a representation indicative of the at least one phase indicator and/or the at least one event indicator to be displayed on the display to thereby provide visualisation of the meeting.

18 Claims, 15 Drawing Sheets

(51) Int. Cl.
| | | |
|---|---|---|
| *G06V 10/80* | (2022.01) | |
| *G06V 10/82* | (2022.01) | |
| *G06V 10/84* | (2022.01) | |
| *H04L 12/18* | (2006.01) | |
| *H04N 7/15* | (2006.01) | |

(52) U.S. Cl.
CPC .............. *G06V 10/82* (2022.01); *G06V 10/85* (2022.01); *G06V 20/46* (2022.01); *H04L 12/1831* (2013.01); *G06V 20/44* (2022.01)

(56) References Cited

U.S. PATENT DOCUMENTS

| | | |
|---|---|---|
| 9,936,162 B1 | 4/2018 | Gadnir et al. |
| 2018/0174600 A1 | 6/2018 | Chaudhuri et al. |
| 2018/0191912 A1 | 7/2018 | Cartwright et al. |
| 2018/0227543 A1* | 8/2018 | Graham ................ H04L 65/403 |
| 2019/0341050 A1* | 11/2019 | Diamant ................ H04N 7/155 |

\* cited by examiner

METHODS AND APPARATUS FOR DISPLAYING, COMPRESSING AND/OR INDEXING INFORMATION RELATING TO A MEETING

FIELD OF THE INVENTION

The present invention relates to an apparatus and/or methods of displaying, compressing and/or indexing information, including information relating to meetings, and, more particularly, a plurality of signals indicative of a meeting between one or more participants.

BACKGROUND

Meetings among groups of participants are common in a business and industry context. Typically, in such settings one or more of the participants may be tasked with minuting events which occur during the meeting, including action points, discussion outcomes, and the like. However, such a system suffers from a number of drawbacks, as meeting minutes can be insufficient, biased, or can fail to be recorded or saved. Moreover, minutes can fail to be distributed or be difficult to access if in the possession of one or two participants.

While it is possible to maintain audio recordings and/or transcriptions of meetings, it can be difficult to discern a summary of events or action points from such recordings.

U.S. Pat. No. 7,298,930, incorporated herein by reference, describes meeting recordal that captures multimodal information of a meeting. Subsequent analysis of the information produces scores indicative of visually and aurally significant events that can help identify significant segments of the meeting recording. Textual analysis can enhance searching for significant meeting segments and otherwise enhance the presentation of the meeting segments.

In McCowan, I et al. 2005, 'Automatic Analysis of Multimodal Group Actions in Meetings', *IEEE Transactions on Pattern Analysis and Machine Intelligence*, vol. 27, no. 3, pp. 305-317, incorporated herein by reference, the paper investigates the recognition of group actions in meetings. A framework is employed in which group actions result from the interactions of the individual participants. The group actions are modelled using different HMM-based approaches, where the observations are provided by a set of audiovisual features monitoring the actions of individuals. Experiments demonstrate the importance of taking interactions into account in modelling the group actions. It is also shown that the visual modality contains useful information, even for predominantly audio-based events, motivating a multimodal approach to meeting analysis.

Wellner et al. 2005, 'A Meeting Browser Evaluation Test', *CHI Extended Abstracts*, incorporated herein by reference, introduces a browser evaluation test (BET) and describes a trial run application of the test. BET is a method for assessing meeting browser performance using the number of observations of interest found in the minimum amount of time as the evaluation metric, where observations of interest are statements about a meeting collected by independent observers. The resulting speed and accuracy scores aim to be objective, comparable and repeatable.

Erol, B et al. 2003, 'Multimodal summarisation of meeting recordings', 2003 *International Conference on Multimedia and Expo ICME*'03, vol. 3 proposes a new method for creating meeting video skims based on audio and visual activity analysis together with text analysis. Audio activity analysis is performed by analyzing sound directions, that indicate different speakers, and audio amplitude. Detection of important visual events in a meeting is achieved by analysing the localized luminance variations in consideration with the omni-directional property of the video captured by a meeting recording system. Text analysis is based on a term frequency-inverse document frequency measure. The resulting video skims better capture the important meeting content compared to the skims obtained by uniform sampling.

The inclusion of any information provided in this background or in the documents referenced in this background is not to be regarded as an admission that such information should be regarded as prior art information that is relevant to the appended claims.

SUMMARY

In a first broad form, the present invention seeks to provide a method of visualising a meeting between one or more participants on a display, the method including, in an electronic processing device, the steps of:
  determining a plurality of signals, each of the plurality of signals being at least partially indicative of the meeting;
  generating a plurality of features using the plurality of signals, the features being at least partially indicative of the signals;
  generating at least one of:
    at least one phase indicator associated with, or in accordance with, the plurality of features, the at least one phase indicator being indicative of a temporal segmentation of at least part of the meeting; and
    at least one event indicator associated with, or in accordance with, the plurality of features, the at least one event indicator being indicative of an event during the meeting; and
  causing a representation indicative of the at least one phase indicator and/or the at least one event indicator to be displayed on the display to thereby provide visualisation of the meeting.

In one embodiment, the plurality of signals includes a plurality of multi-modal signals.

In one embodiment, determining the plurality of signals includes any one or more of the following steps:
  causing at least one of the plurality of signals to be captured;
  retrieving at least one of the plurality of signals from a store; and
  receiving at least one of the plurality of signals from a remote processing device.

In one embodiment, the method includes, in the electronic processing device, the steps of:
  generating a plurality of feature vectors wherein each feature vector is generated using a respective one of the multi-modal signals; and
  generating a plurality of multi-modal feature vectors using the feature vectors; and,
  classifying the multi-modal feature vectors.

In one embodiment, the step of generating the at least one phase indicator is carried out using the results of the classification.

In one embodiment, the step of generating the at least one phase indicator is carried out using any one or more of:
  at least one hidden Markov model;
  at least one state machine; and
  at least one temporal filter.

In one embodiment, the at least one temporal filter includes at least one of an erosion filter and a dilation filter.

In one embodiment, generating the at least one event indicator includes the step of anomaly detection.

In one embodiment, the method includes, in an electronic processing device, determining at least one event type associated with each event and wherein, in the step of generating at least one event indicator, the representation is indicative of the event type.

In one embodiment, determining the at least one event type includes any one or more of the following steps:
  causing at least one of the at least one event type to be captured;
  retrieving at least one of the at least one event type from a store; and
  receiving at least one of the at least one event type from a remote processing device.

In one embodiment, the event type includes any one or more of:
  an action;
  a mood;
  a sentiment;
  a highlight;
  a question;
  recapitulation;
  a milestone; and,
  an event type determined in accordance with user input.

In one embodiment, generating at least one event indicator includes detecting outliers among the plurality of multi-modal feature vectors using the results of the classification.

In one embodiment, the method includes, in the electronic processing device, determining at least one of:
  at least one phase parameter; and,
  at least one event parameter.

In one embodiment, the plurality of features is generated in accordance with at least one of the phase parameters and the event parameters.

In one embodiment, classifying the multi-modal feature vectors includes using any one or more of:
  a supervised classification;
  an unsupervised classification; and
  an expert rule-based classification.

In one embodiment, classifying the multi-modal feature vectors includes using any one or more of:
  at least one rule-based classification;
  at least one neural network;
  at least one Gaussian mixture model;
  at least one hidden Markov model;
  at least one support vector machine;
  unsupervised k-means clustering; and
  spectral clustering.

In one embodiment, the plurality of signals includes any one or more of:
  at least one audio signal;
  calendar data;
  user input;
  at least one document;
  at least one image signal; and
  at least one video signal.

In one embodiment, the at least one feature is generated from the plurality of signals using any one or more of:
  at least one neural network;
  at least one clustering algorithm;
  at least one hidden Markov model;
  a filter;
  at least one transcription algorithm;
  at least one natural language processing algorithm; and
  at least one image recognition algorithm.

In one embodiment, the method includes, in the electronic processing device, the steps of:
  determining at least one meeting parameter; and
  generating at least one of the at least one phase indicator and the at least one event indicator in accordance with the meeting parameter.

In one embodiment, the at least one meeting parameter is indicative of any one or more of:
  an industry;
  a company and/or organisation;
  at least one identity of the one or more participants;
  one or more preferences; and
  a location.

In one embodiment, the representation includes at least one temporal indicator indicative of a time range of the meeting.

In one embodiment, the representation in the step of generating at least one event indicator includes at least one graphical indication of at least one of the phase indicator and the event indicator.

In one embodiment, the representation includes at least one textual indication of at least one of the phase indicator and the event indicator.

In one embodiment, the representation includes at least one transition indicator indicative of a temporal sequence of at least one of the at least one phase indicator and the at least one event indicator.

In one embodiment, the representation includes at least one textual and/or graphical indication of a respective one of the features associated with at least one of the phase indicator and the event indicator.

In one embodiment, the method includes, in the electronic processing device, the steps of:
  receiving an input selection associated with at least one of the phase indicator and the event indicator;
  selectively updating the representation to include an indication of a respective one of the features associated with the selected one of the phase indicator and/or the event indicator; and
  causing the updated representation to be displayed.

In one embodiment, the method includes, in the electronic processing device, the steps of:
  receiving an input selection associated with at least one of the phase indicator and the event indicator;
  selectively updating the representation to include an indication of a respective one or more of the plurality of signals associated with the selected one of the phase indicator and/or the event indicator; and
  causing the updated representation to be displayed.

In one embodiment, the respective one or more of the plurality of signals includes at least one of one or more audio signals, one or more video signals, and at least a portion of a transcript.

In a second broad form, the present invention seeks to provide a method of compressing a plurality of signals indicative of a meeting between one or more participants, the method including, in an electronic processing device, the steps of:
  generating a plurality of features using the plurality of signals, the features being indicative of the signals;
  generating at least one of:
    at least one phase indicator associated with, or in accordance with, the plurality of features, the at least one phase indicator being indicative of a temporal segmentation of at least part of the meeting; and at least one event indicator associated with, or in accordance with, the plurality of features, the at least one event indicator being indicative of an event during the meeting; and causing the plurality of signals to be compressed in accordance with the at least one phase indicator and/or the at least one event indicator.

In one embodiment, the method includes, in the electronic processing device, the steps of:

receiving an input selection associated with at least one of the phase indicator and the event indicator; and selectively providing an indication of a respective one of the features associated with the selected one of the phase indicator and/or the event indicator, to thereby compress the plurality of signals.

In one embodiment, the method includes, in the electronic processing device, the steps of:

receiving an input selection associated with at least one of the phase indicator and the event indicator; and selectively providing an indication of a respective one or more of the plurality of signals associated with the selected one of the phase indicator and/or the event indicator, to thereby compress the plurality of signals.

In one embodiment, the respective one or more of the plurality of signals includes at least one of one or more audio signals, one or more video signals, and at least a portion of a transcript.

In one embodiment, the method further includes any one or more of the features of any of the examples herein.

In a third broad form, the present invention seeks to provide a method of indexing a plurality of signals indicative of a meeting between one or more participants, the method including, in an electronic processing device, the steps of:

generating a plurality of features using the plurality of signals, the features being indicative of the signals;

generating at least one of:
at least one phase indicator associated with, or in accordance with, the plurality of features, the at least one phase indicator being indicative of a temporal segmentation of at least part of the meeting; and
at least one event indicator associated with, or in accordance with the plurality of features, the at least one event indicator being indicative of an event during the meeting; and causing the signals to be indexed in accordance with the at least one phase indicator and/or the at least one event indicator.

In one embodiment, the method includes, in the electronic processing device, the steps of:

receiving an input selection associated with at least one of the phase indicator and the event indicator; and selectively indexing a respective one of the features associated with the selected one of the phase indicator and/or the event indicator.

In one embodiment, the method includes, in the electronic processing device, the steps of:

receiving an input selection associated with at least one of the phase indicator and the event indicator; and selectively indexing a respective one or more of the plurality of signals associated with the selected one of the phase indicator and/or the event indicator.

In one embodiment, the respective one or more of the plurality of signals includes at least one of one or more audio signals, one or more video signals, and at least a portion of a transcript.

In one embodiment, the method further includes the step of generating any one or more of the features of any of the examples herein.

In a fourth broad form, the present invention seeks to provide a method of displaying information on a display relating to a meeting between one or more participants, the method including, in an electronic processing device, the steps of:

determining a plurality of signals, each of the plurality of signals being at least partially indicative of the meeting;

generating a plurality of features using the plurality of signals, the features being indicative of the signals;

generating at least one of:
at least one phase indicator associated with, or in accordance with, the plurality of features, the at least one phase indicator being indicative of a temporal segmentation of at least part of the meeting; and
at least one event indicator associated with, or in accordance with, the plurality of features, the at least one event indicator being indicative of an event during the meeting; and causing a representation indicative of the at least one phase indicator and/or the at least one event indicator to be displayed on the display to thereby provide information indicative of the meeting.

In one embodiment, the method further includes generating any one or more of the features of any of the examples herein.

In a fifth broad form, the present invention seeks to provide an apparatus for visualising a meeting between one or more participants on a display, the apparatus including an electronic processing device that is configured for carrying out the steps of:

determining a plurality of signals, each of the plurality of signals being at least partially indicative of the meeting;

generating a plurality of features using the plurality of signals, the features being at least partially indicative of the signals;

generating at least one of:
at least one phase indicator associated with, or in accordance with, the plurality of features, the at least one phase indicator being indicative of a temporal segmentation of at least part of the meeting;
at least one event indicator associated with, or in accordance with, the plurality of features, the at least one event indicator being indicative of an event during the meeting; and causing a representation indicative of the at least one phase indicator and/or the at least one event indicator to be displayed on the display to thereby provide visualisation of the meeting.

BRIEF DESCRIPTION OF THE DRAWINGS

Some embodiments of the present invention are hereinafter described, by way of example only, with reference to the accompanying drawings, wherein.

DETAILED DESCRIPTION

Figure 1:
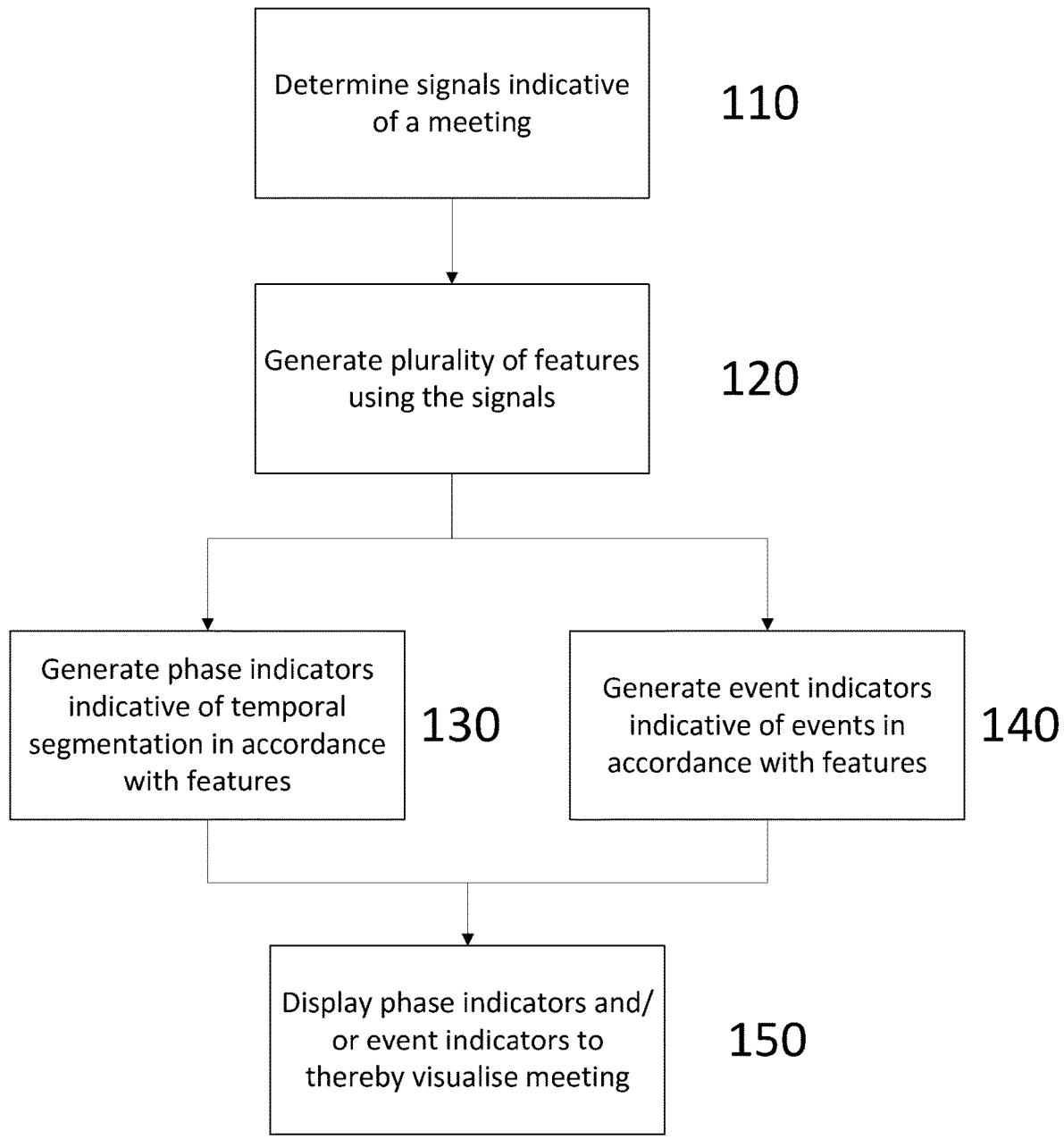
FIG. 1 is a flowchart of an example method of visualisation of a meeting between one or more participants on a display.

An example of a method of visualising a meeting between one or more participants on a display will now be described with reference to FIG. 1.

For the purpose of this example, it is assumed that the process is performed at least in part using an electronic processing device, such as a processor of a processing system, which in one example is connected to one or more computer systems, such as network servers, via a network architecture, as will be described in more detail below.

In this example, at step 110, the electronic processing device is configured so that it operates to determine a plurality of signals, each of the plurality of signals being at least partially indicative of the meeting. The term "meeting" is not meant to be limiting and may include any appropriate interaction of participants, including an interaction wherein a sole participant generates appropriate signals (e.g. a single participant dictating, or the like). Moreover, while any suitable signal indicative of the meeting may be used, typically the signals include any one or more of audio, video and/or image signals, calendar data, user input, and one or more documents. Accordingly, the term "signal" is not meant to be limiting and can include any suitable data relating to the meeting.

While in some examples the signals are of the same modality, more typically, the signals determined are multi-modal, for example, obtained using different modalities. Moreover, the plurality of signals may be determined in any suitable manner, including any one or more of causing the signals to be captured in accordance with their respective modality, receiving the plurality of signals from a store or remote processing system, or the like and this will be discussed further below.

At step 120, the method includes generating a plurality of features using the signals, the features being indicative of the signals. This may be achieved in any suitable manner, and typically the features generated depend upon the signal modality. For example, features extracted from one or more audio signals may include an indication of audio quality, a transcription, an indication of the identity of the participant speaking, sentiment indicators, topics or semantic concepts discussed or in documents, or the like. Accordingly, the generation of features is achieved through any suitable one or more processes including automatic transcription algorithms, natural language processing, digital signals processing, machine learning, filtering, and the like, and this will be discussed in further detail below. Typically, generation of the plurality of features is automatic, however in some examples step 120 may include at least partial manual interaction.

One or more phase indicators are generated at step 130 in accordance with, or associated with, the plurality of features. In this regard, the phase indicators are indicative of a temporal segmentation of at least part of the meeting. Accordingly, typically the phase indicators identify different segments within the temporal segmentation. More typically, the phase indicators can be indicative of temporal segments in which respective features are internally coherent. While this may be achieved in any suitable manner, typically this includes a classification algorithm, and this will be described in more detail below.

At step 140, one or more event indicators are generated in accordance with, or associated with, the plurality of features. In this respect, the event indicators are indicative of events during the meeting. While events can include any suitable occurrence during the meeting (including, for example, a user defined event), more typically anomalous and/or outlier features(s) are indicative of events. In this regard, events may include actions, highlights, disagreements, or the like. In any event, this will be discussed further below.

While FIG. 1 includes both steps 130 and 140 (shown in parallel), in other examples of the method may include either step 130 or step 140. The method may include generating one or more phase indicators and/or one or more event indicators, for example. Moreover, these steps may be performed in any particular order, including in series or in parallel as shown in the example. In one example, the method includes generating one or more phase indicators and one or more event indicators. This may be particularly advantageous in providing an overview of an entire meeting, for example, by showing main phases of discussions, and any key highlights/actions/questions, without the need to replay an entire meeting audio recording, or read an entire transcript.

At step 150 the method includes causing a representation indicative of the phase indicators and/or the event indicators to be displayed on the display, to thereby provide visualisation of the meeting. This may be achieved in any suitable manner, including sending control signals to the display to cause the representation to be displayed, sending data indicative of the representation to a remote display and/or remote processing device for display, and/or storing data indicative of the representation in a store for display at a pre-determined or future time. Additionally, the representation may include any appropriate indication of the phase and/or event indicators, including displaying values associated with the indicators, textual or graphical indicators, or the like and this will be described in more detail below.

Beneficially, the above-mentioned method provides an unbiased summary of meeting information obtained, for example, from multiple sources using multiple modalities. Such efficient visualisation allows rapid access to meeting information which may be required for a user to accurately answer meeting or business-related questions, achieve tasks, and the like. Moreover, for recorded meetings, the representation in accordance with this example provides an accurate meeting summary which obviates the need to spend time replaying the entire meeting and/or review an entire transcript. Advantageously, users who did not participate in the meeting(s) are able to utilise the representation to understand and appreciate the meeting discussions and events.

Additionally, while the process is described in respect of one meeting in the above example, it will be appreciated that the process may be applied to any number of meetings. Accordingly, for a plurality of meetings, the display of the abovementioned representation provides the ability to rapidly visualise multiple meetings, significantly improving productivity and efficiency. This can be particularly beneficial in facilitating the extraction of meeting information from a large archive containing data relevant to numerous meetings.

In one instance, a user is rapidly able to understand the meeting using the displayed representation which can include phase indicators indicative of a sequence of internally coherent temporal phases, and/or event indicators, which are typically indicative of temporal outliers or anomalous events that occurred during the meeting.

In one example, the process is performed at least in part using a processing system, such as a suitably programmed computer system. This can be performed on a stand-alone computer, with the microprocessor executing application software allowing the above described method to be performed, as will now be described with reference to FIG. 2. Alternatively, the process can be performed by one or more processing systems operating as part of a distributed architecture.

Figure 2:
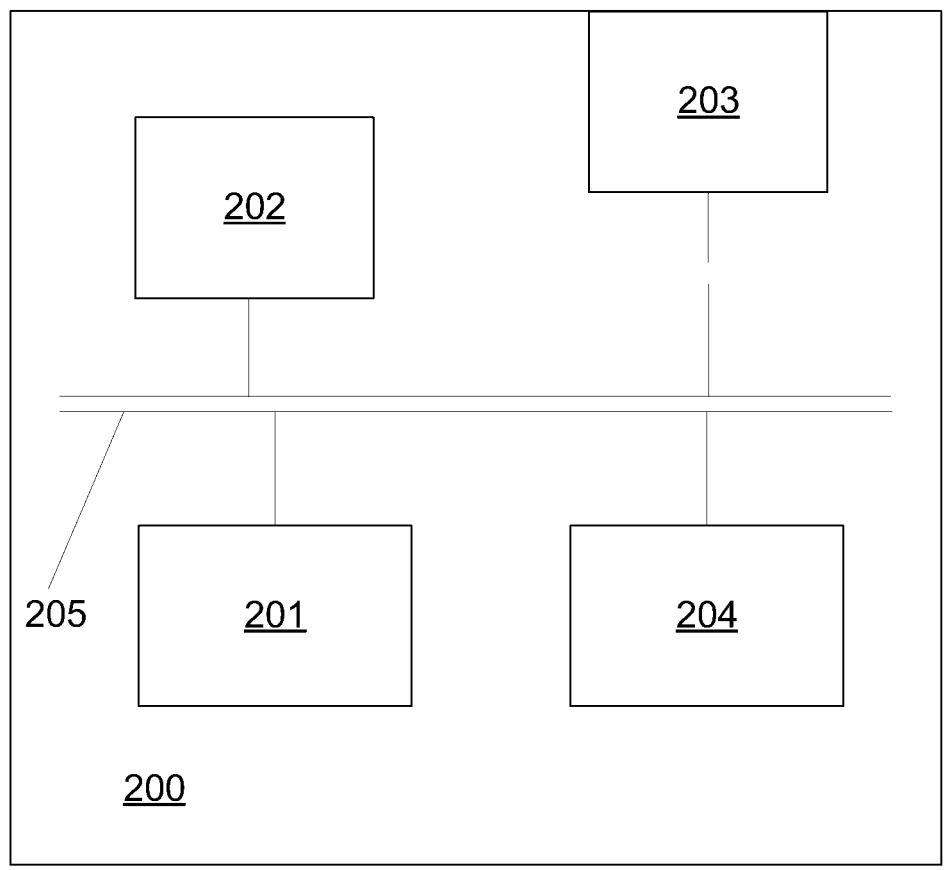
FIG. 2 is a schematic of an example electronic processing device for performing any one of the processes described herein.

As shown in FIG. 2, in one example, the electronic processing system 200 includes an electronic processing device, such as at least one microprocessor 201, a memory 202, an external interface 203, and an input/output interface 204 interconnected via a bus 205, as shown. In this example, the external interface 203 can be utilized for connecting the processing system 200 to peripheral devices, such as communications networks, wireless communication connections, databases, other storage devices, signal capture device(s), the display, or the like. Although a single external interface 203 is shown, this is for the purpose of example only, and in practice multiple interfaces using various methods (e.g. Ethernet, serial, USB, wireless or the like) may be provided.

Moreover, the communication networks may be of any appropriate form, such as the Internet and/or a number of local area networks (LANs) and provides connectivity between the processing system 200 and other processing systems, such as a remote electronic processing device associated with a signal capture device, or the like. It will however be appreciated that this configuration is for the purpose of example only, and in practice the processing systems can communicate via any appropriate mechanism, such as via wired or wireless connections, including, but not limited to mobile networks, private networks, such as an 802.11 networks, the Internet, LANs, WANs, or the like, as well as via direct or point-to-point connections, such as Bluetooth, or the like.

In use, the microprocessor 201 executes instructions in the form of applications software stored in the memory 202 to perform required processes, for example, to allow communication with other processing systems. Thus, actions performed by the electronic processing device 200 are performed by the processor 201 in accordance with instructions stored as applications software in the memory 202 and/or input commands received via the communications network. The applications software may include one or more software modules, and may be executed in a suitable execution environment, such as an operating system environment, or the like.

Accordingly, it will be appreciated that the electronic processing device 200 may be formed from any suitable processing system, such as a suitably programmed PC, Internet terminal, lap-top, hand-held PC, smart phone, PDA, tablet, or the like. Thus, in one example, the processing system 200 is a standard processing system, such as a 32-bit or 64-bit Intel Architecture based processing system, which executes software applications stored on non-volatile (e.g., hard disk) storage, although this is not essential. However, it will also be understood that the processing systems 200 can be any electronic processing device, such as a microprocessor, microchip processor, logic gate configuration, firmware optionally associated with implementing logic, such as an FPGA (Field Programmable Gate Array), or any other electronic device, system or arrangement.

Whilst a single processing system 200 is shown in this example, it will be appreciated that functions may be split among multiple processing systems 200 in geographically separate locations, and in some examples may be performed by distributed networks of processing systems 200 and/or processing systems provided as part of a cloud-based architecture and/or environment.

Figure 3:
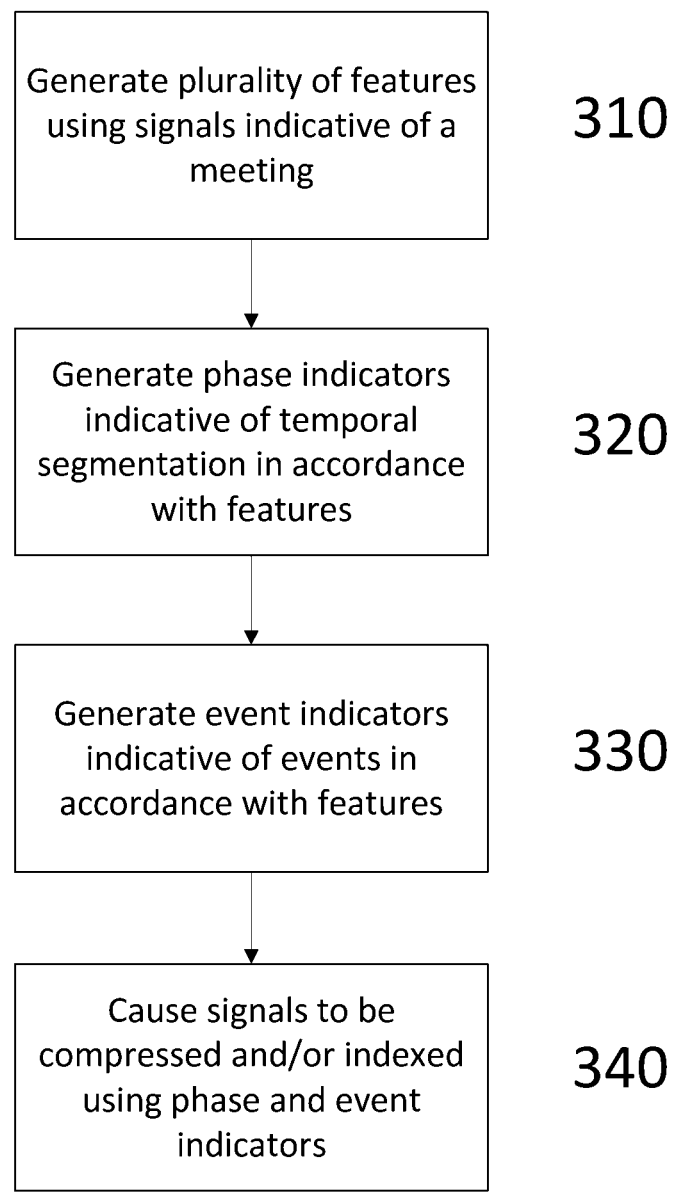
FIG. 3 is a flowchart of an example method of compressing and/or indexing a plurality of signals indicative of a meeting between one or more participants.

A further example will now be described with reference to FIG. 3. In this example, a method of indexing and/or compressing a plurality of signals indicative of a meeting between one or more participants will be described. For the purpose of this example, it is assumed that the process is performed at least in part using an electronic processing device, such as in the example described above.

At step 310, the method includes generating a plurality of features using the plurality of signals, the features being indicative of the signals. As described above, the signals may include any suitable data or information relating to the meeting, including of the same or multiple modalities. More typically, the signals are multi-modal signals, and include any one or more of audio, image and/or video signals, documents, calendar information, and user input. Features may be generated in any number of manners, as discussed above, such as automatically and/or semi-automatically.

At step 320, the method includes generating one or more phase indicators in accordance with, or associated with, the features. In this regard, the phase indicator(s) are indicative of a temporal segmentation of at least part of the meeting. As discussed herein, typically the temporal segmentation can be generated at least partially using a classification of the features, as will be described further below.

At step 330, the method includes generating one or more event indicators in accordance with, or associated with, the plurality of features. In this regard, the event indicators are indicative of an event during the meeting. As described herein, in some examples events are indicative of an outlier and/or anomalous feature(s). In other examples, events may include user defined or pre-determined occurrences. In any event, this will be described in more detail below.

As discussed above, while this example includes both steps 320 and 330, in another embodiments step 320 or 330 may be omitted. Thus, for instance, the method may include generating one or more phase indicators and/or one or more event indicators, as appropriate.

At step 340, the method includes causing the signals to be indexed and/or compressed in accordance with the one or more phase indicators and/or the one or more event indicators. This may be achieved in any suitable manner. For example, in causing the signals to be compressed, the phase and event indicators may be used to select a subset of the signals and/or features as representative of the meeting. For example, phase and/or event indicators may be indicative of temporal locations in the signals, such that the subset of signals/features is selected in accordance with the temporal locations. Additionally, or alternatively, the phase indicators and/or event indicators may include textual values which represent topics or decisions, such that the indicators may be used as representative of the meeting.

Beneficially, compression and/or indexing can facilitate the storage and analysis of numerous meetings, for example for the purposes of data warehousing, business intelligence, analytical reporting, structured and/or ad hoc queries, and/or decision making. As data relating to meetings increases, indexing/compression in any of the manners described herein can facilitate any big data functions or techniques.

In one example, which will be described in further detail below, the process may include receiving an input selection associated with one or more of the phase indicator(s) and/or event indicator(s) and selectively either providing and/or indexing or compressing a respective one of the signals/features in accordance with the selected phase indicator(s) and/or event indicator(s). Thus, a user may be able to use indexed audio of the meeting to navigate and playback only the audio associated with events or phases. This is particularly useful in providing a user with a rapid method of assimilating the key information relating to an entire meeting or meetings. In a further example, the signals or features associated with event indicators and/or particular phase indicators may be retained and stored, discarding the remaining signals. Such an example provides a method of compressing the signals relating to a meeting by only retaining signals which pertain to particularly significant or customised/preferential events or phases. Any suitable signals or features may be used for indexation and/or compression in this manner, for example portions of the speech transcript, video signals, or the like.

In terms of the signals and/or features associated with the event and/or phase indicators, this may include signals and/or features directly defined by temporal boundaries associated with the indicators, and/or with temporal boundaries which encompass those defined by the indicators (such as being +/− a predefined amount on either side of the temporal boundaries), and/or any other appropriate association.

In any event, a number of further features will now be described.

In one example, determining the plurality of signals includes causing at least one of the plurality of signals to be captured, retrieving at least one of the plurality of signals from a store, and/or receiving at least one of the plurality of signals from a remote processing device. Thus, for example, signals may be predetermined, such as data retrieved from a calendar application or software, or may be obtained by causing one or more sensors such as microphones, cameras, or the like to capture the signals.

Additionally, or alternatively, the process may include generating a plurality of feature vectors where each feature vector is generated using a respective one or more of the multi-modal signals. Thus, in this respect signals obtained by different modalities may be respectively utilised in order to extract feature vectors, such as calculating speaker identities, voice pitch, and speaking rate during the meeting using audio signals, detecting gestures using video signals, recognising notes and diagrams from whiteboard usage captured using an image, and the like. This may be achieved in any suitable manner, and typically can depend upon the modality of respective signals. For example, audio quality vectors may be detected using filters, participant gesture vectors may be detected using video signal segmentation and recognition algorithms, speaker voice embedding vectors calculated using audio signals and neural networks, and the like. This will be discussed in further detail below. In other instances, feature vectors may be generated using more than one modality, such as sentiment vectors generated using audio signals and text-based transcript(s). Additionally, or alternatively, different feature vectors may be generated using the same plurality of signals, such as grammatical parsing of a speech transcript, and punctuator data extracted from the same transcript.

In any event, this example includes generating a plurality of multi-modal feature vectors using the feature vectors. Accordingly, each multi-modal feature vector typically includes features extracted from multiple feature vectors in accordance with, or associated with, the same or similar temporal associations. In this regard, feature vectors may need to be up- or down-sampled. In other embodiments, the multimodal feature vector sequences may be generated using a more sophisticated combination method, such as using a dimensionality reducing neural network, principal component analysis (PCA) and/or the like.

In some instances, the multi-modal feature vector incorporates feature vectors derived from the same signals, such as a multi-modal feature vector including results of grammatical parsing, and punctuator data, which were extracted using the same speech transcript as described above.

In addition, the method of this example includes classifying the multi-modal feature vectors. Any suitable method of classification may be used, as will be discussed below, with the classification resulting in detecting classes of multi-modal feature vectors which are internally coherent/internally similar.

In this respect, classifying the multi-modal feature vectors typically includes supervised classification, unsupervised classification, and/or an expert rule-based classification. For example, this may include one or more of a rule-based classification, supervised machine learning classification, neural networks, Gaussian mixture model, hidden Markov model, support vector machines, unsupervised Dirichlet process, unsupervised k-means clustering, and/or spectral clustering, or the like. Training and/or labelled data sets, for example for supervised classification methods, may be obtained in any suitable manner, including user-defined labels, or the like. In some instances, while user-defined labels may initially be used, the training data may be dynamically updated using the results of subsequent classifications. Similarly, user-defined labels may be gathered on the output of an initial unsupervised or rule-based classifier, for instance to confirm whether the classified event is significant to a user, and then such user-defined labels may be used to train a more complex supervised classifier.

In some examples, the same classification may be used in determining both event and phase indicators, however in other examples different features and classifications may be used to determine event and phase indicators respectively. Hence, phases may reflect a temporal segmentation in accordance with features relating to speaking terms, concepts and sentiments, while events reflect anomalies detected among features relating to particular word combinations, the role of speakers, etc.

In some instances, the temporal segmentation is generated using the results of the classification. Any suitable method of generating the segmentation using the classification may be used, and typically includes smoothing, removing spurious feature vectors, and the like. In one example, generating the temporal segmentation includes using one or more hidden Markov models, state machines, particle filtering and/or temporal filters. For example, the temporal filter includes a maximum and/or minimum window filter, such as dilation and erosion filters or operations, or the like.

In some instances, the classification results are compared to a minimum and/or maximum temporal threshold, and the temporal segmentation refined accordingly. For example, the minimum and/or maximum temporal threshold may be indicative of a minimum and/or maximum phase duration, such that classifications which result in spuriously short (or long) phases are removed from the segmentation and re-classified. In some examples, the minimum threshold may be any one of at least 30, 40, 60, 120 seconds, or the like. Beneficially this ensures more robust segmentation.

In terms of generating the at least one event indicator, in some examples this includes anomaly detection and/or outlier detection. Accordingly, an event typically defines rare items, occurrences or observations during the meeting which differ significantly from the majority of the features or feature vectors. As will be appreciated, any suitable form of anomaly detection may be used, for example supervised, unsupervised or semi-supervised anomaly detection. As anomaly detection techniques are known in the art, they will not be described in more detail here.

In some instances, generating the event indicator includes detecting outliers among the plurality of multi-modal feature vectors using the results of the classification. This may be achieved in any suitable manner, such as supervised, unsupervised or semi-supervised anomaly detection as described above.

In one example, the process includes determining one or more event types associated with each event, where the representation is indicative of the event type. For example, the event type may include an action, a mood, a sentiment, a highlight, a question such as a key question, a recapitulation, a milestone and/or the like. In some instances, the event type may be determined in accordance with user input, such that a user or operator is able to select or define a particular event type. In this regard, different event types may be indicative of different types of anomalies/outliers and/or determined using different feature vectors and/or multi-modal feature vectors. Sentiment events may be determined in accordance with outliers among features relating to speaking volume, speech rate, voice pitch, text based sentiment vectors, etc. In a further example, milestone events may be determined in accordance with anomalies among features relating to the prominence of speaker, speaker words, volume, and the like. Advantageously, this allows features to be classified in different manners, in order to detect different event types which can be useful in summarising/parameterising the meeting. Event types may be retrieved from a store, received from a remote processing device, and/or the process may cause the event type to be captured, such as via user input, preference, or the like.

Additionally, or alternatively, the process may include determining one or more phase parameters and/or event parameters. In this regard, for example, the plurality of features may be generated in accordance with, or associated with, the phase parameters and/or the event parameters. For example, phase parameters may be indicative of parameters relating to the desired temporal segmentation. In one instance, it may be desired to select phases in the meeting which delineate discussions relating to different topics, or define discussions led by different speakers or the like. In this respect, the phase parameters may relate to the different types of features generated using the signals, or the method used to generate the features or temporal segmentation. Additionally, determining the phase parameter(s) and/or event parameter(s) may include receiving an indication of the parameters from user input, a memory store, a remote processing device, or the like. Alternatively, the parameter(s) may be predetermined parameter(s), for example, indicative of organisation, group, team or personal preferences, or parameter(s) determined in accordance with other population preferences.

In one example, the feature(s) are generated from the signals using one or more neural networks, clustering algorithms, hidden Markov models, filters, transcription algorithms, natural language processing algorithms and/or image recognition algorithms. However, this is not essential and in it will be appreciated that any suitable method for determining features from signals can be used. In some instances, multi-modal signals may be used in determining features, such as using speaking tones and the audio transcription to determine sentiment features.

Optionally, one or more meeting parameters are determined, and the phase indicator and/or event indicator generated in accordance with, or associated with, the meeting parameters. In this regard, any suitable meeting parameter may be used, including any one or more of an industry, a company and/or organisation, the identity of the one or more participants, one or more preferences, and/or location(s). Thus, such meeting parameters may be used to supplement feature vectors and/or multimodal feature vectors, to parameterise the generation of event and/or phase indicators or the like. This can be advantageous as it allows the signals to be displayed and/or compressed according in accordance with customisation unique to particular contexts.

In one example, the representation includes one or more temporal indicators indicative of a time range of the meeting. Thus, the temporal indicators may include linear timelines, including vertical or horizontal, numeric time values, ranges, or the like. Beneficially, this can provide an overview of the meeting timeline, including temporal locations of events, phases and the like, and this will be described in more detail below.

In some instances, the representation may be customisable and/or dynamic. This can be beneficial in providing a user with an overview of the meeting while allowing them to drill down into specific events and phases as they deem appropriate.

Optionally, the representation includes at least one graphical indication of the phase indicator and/or event indicator. A graphical indication may include any suitable graphical indicia including colours, shapes, graphs, images and the like. In some examples, a size of the graphical indication may be indicative of duration, such as the length of a rectangle being indicative of the time range associated with a phase. In other examples, a colour of the graphical indication may be indicative of an event and/or phase type. Beneficially then, blue indicia may correspond to highlights while purple indicia correspond to action points. In another example, green indicia may correspond to discussion-type phases where blue indicia are indicative of question and answer phases.

Additionally, or alternatively, the representation includes one or more textual indications of the phase indicator and/or the event indicator. Such textual indications may be determined using, or derived from, the respective plurality of signals or features, such as concepts or topics which dominate a discussion based phase, or participants to which an action point event is assigned. In other examples, textual indications may be predetermined, user-defined or the like.

In some examples, the representation includes one or more transition indicators indicative of a temporal sequence of the phase indicators and/or the event indicators. In this regard, transition indicators can represent the respective sequence of phases and events, such as arrows, lines, and the like. However, this is not essential and in other examples the representation may include numerical values of time, or the like.

In some instances, the representation includes one or more textual and/or graphical indications of a respective one of the features associated with the phase indicator(s) and/or the event indicator(s). For example, subsections of the meeting transcript relating to an event may be included in the representation, such that only text relating to the determined events is displayed. Accordingly, associated features and/or signals can provide further context around phases and events without users having to read/listen and digest an entire meeting transcript/audio.

Furthermore, in one example, the process may include receiving an input selection associated with the phase indicator and/or event indicator, selectively updating the representation to include an indication of the respective one of the features associated with the selected phase indicator and/or event indicator, and causing the updated representation to be displayed. Thus, the representation can provide a high-level overview of the meeting which allows a user to select different phases, events, or the like in order to display features or signals relating to the selection. Thus, a user can, for example, click on an event to view the transcript at that time in the meeting, or select a phase to see which participants were key or active contributors, or the like.

Additionally, or alternatively, the process may include receiving an input selection associated with the phase indicator and/or event indicator, selectively updating the representation to include an indication of the respective one of the plurality of signals associated with the selected phase indicator and/or event indicator, and causing the updated representation to be displayed. This can be particularly beneficial in displaying only events or phases which are determined to be representative of the meeting, hence providing an overview of the meeting to a user. Furthermore, a user is thus able to navigate to portions of the meeting, using the event/phase indicators, and play or read only signals relating to those portions. Hence, events and phases can provide points and/or navigation aids to the user which enable them to seek the related audio, for example in a media stream playback (audio, video, other streaming data signal), speech transcript or the like.

Beneficially this facilitates the ability to rapidly find and listen to the context relating to an event, or to focus on listening to a particular phase, or the like.

Figure 4:
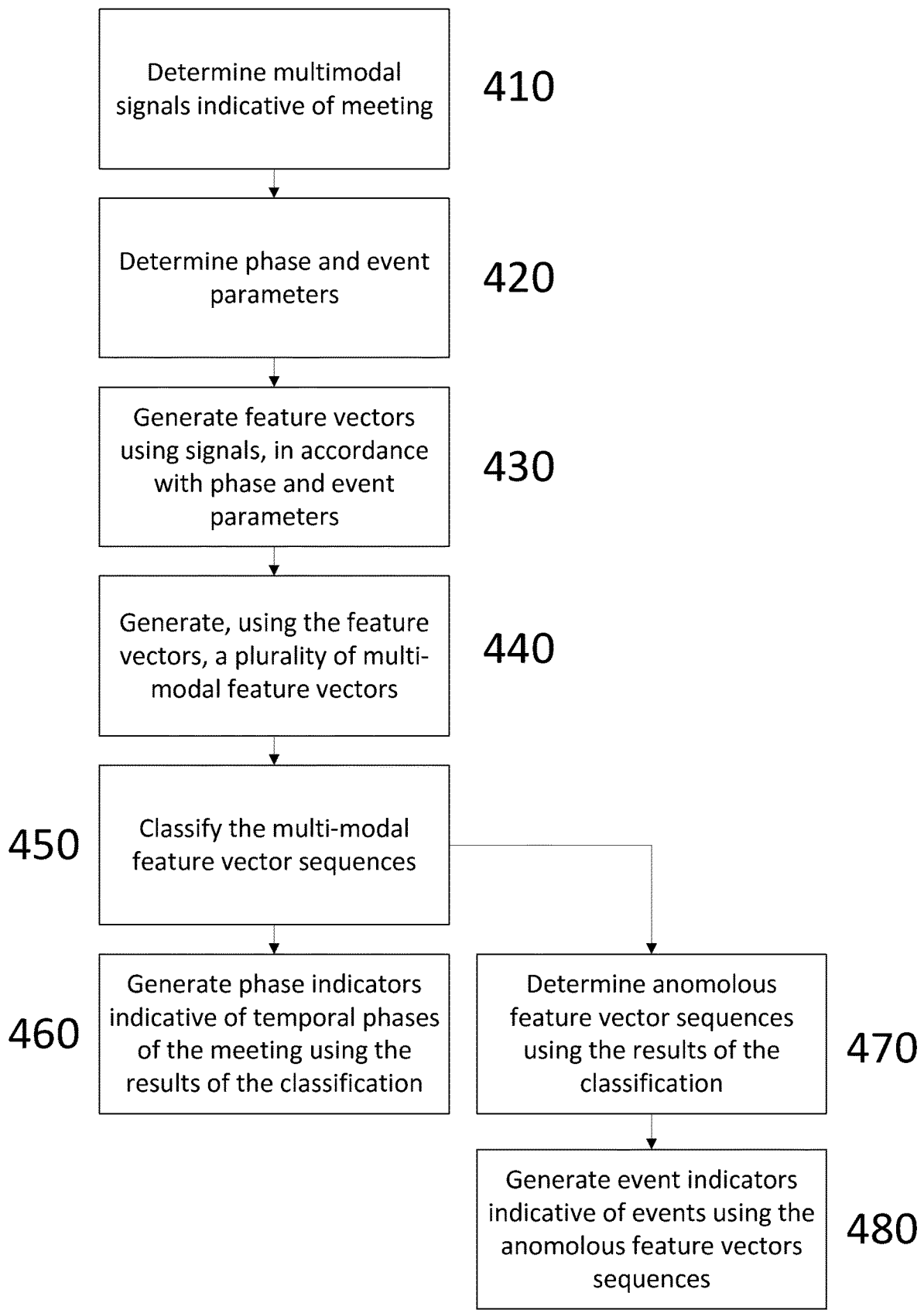
FIG. 4 is a flowchart of a further example of a method of visualisation of a meeting.

A further example of a method for generating the phase and event indicators will now be described with reference to FIG. 4. In this example, phases and event indicators are determined using the same classification, however as discussed herein this is not essential and in other examples different feature vectors and classifications may be utilised to determine phase and event indicators respectively.

At step 410, the process includes determining a number of multimodal signals indicative of the meeting. As discussed above, signals can include audio signals, calendar data, user input and the like. At step 420, phase and event parameters are determined. This step can be performed in any suitable manner, including retrieving predetermined parameters, receiving the parameters via user input, generating the parameters based upon preferences, context, meeting parameters or the like.

In any event, the phase and event parameters are used at step 430 in generating feature vectors using the signals. In this regard, the phase parameters can be indicative of the type of segmentation to be performed, such that feature vectors are generated appropriately.

At step 440, multi-modal feature vectors are generated using the feature vectors, which at step 450 are classified according to a classification algorithm. As discussed above, the classification algorithm may be any suitable supervised, unsupervised or semi-supervised method, and in addition may be selected in accordance with the phase and/or event parameters.

At step 460, phase indicators indicative of temporal segmentation of the meeting are generated using the results of the classification. At step 470, anomalous feature vector sequences are detected using the results of the classification, and event indicators indicative of the detected anomalous events are generated in step 480.

Figure 5:
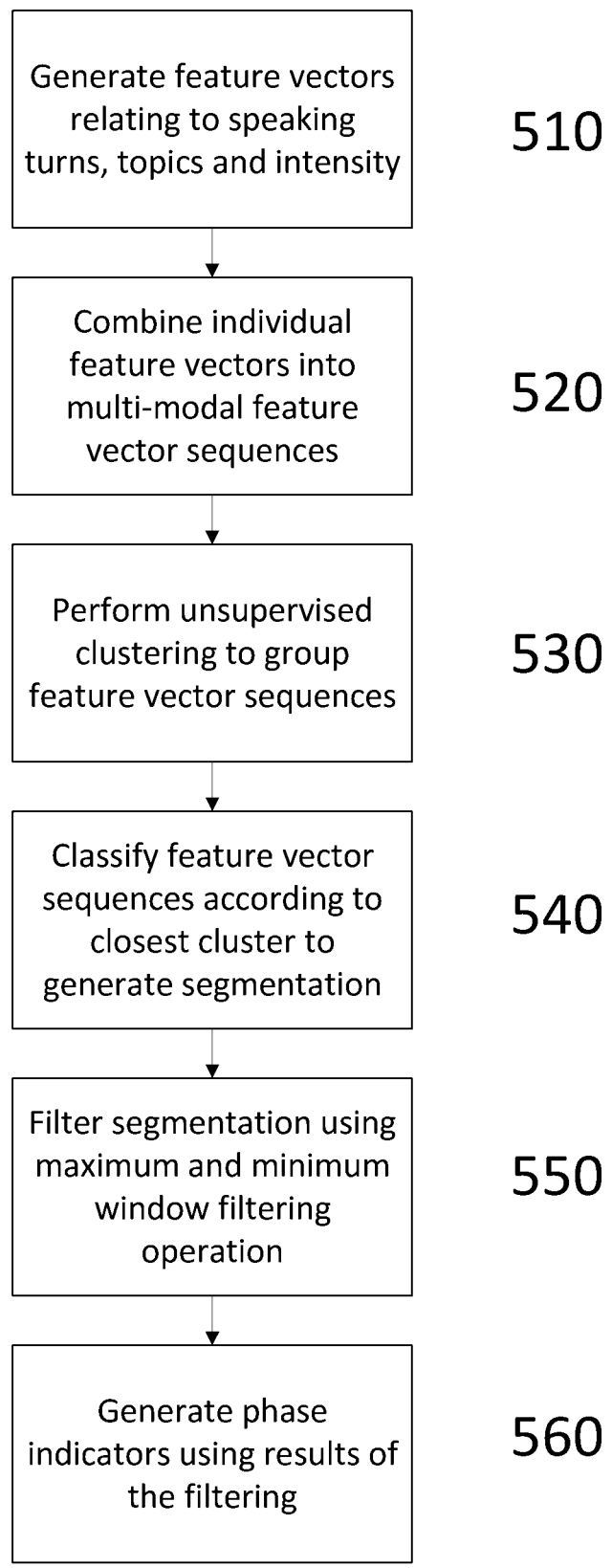
FIG. 5 is a flowchart of a further example of a method of generating one or more phase indicators.

An example of a method of generating one or more phase indicators indicative of events in a meeting will now be described with reference to FIG. 5. In this example, the phase indicators are determined in accordance with joint coherence among the distribution of speaking turns between the participants, the distribution in terms of one or more concepts or topics being discussed, and the sentiment or intensity of the conversation. Accordingly, in this regard, a meeting phase may represent any of the following example situations:

a brief but intense dialogue between two people about technology and privacy, just a single person giving a long dispassionate presentation on sales strategy, and, a long group discussion related to international finance characterised by several disagreements.

At step 510, the method includes generating feature vectors in accordance with the abovementioned phase parameters relating to speaking turns, topics and sentiment/intensity.

Thus, feature vectors extracted include speaker voice embedding vectors from a neural network, speaker labels from a first level speaker clustering, word embedding vectors from a neural network, named entity vectors, text-based sentiment vectors (e.g. [p(negative), p(neutral), p(positive)]), voice pitch, and speaking rate.

These feature vectors are combined at step 520 into multimodal feature vector sequences. This may be achieved in any suitable manner, including forming multimodal feature vector sequences by concatenating feature vectors at each time step or temporal location and/or per word (e.g. in a transcript), per sentence, per speaking turn, or the like. In other embodiments, the multimodal feature vector sequences may be generated using a more sophisticated combination method, such as using a dimensionality reducing neural network, principal component analysis (PCA) and/or the like.

At step 530, unsupervised clustering, such as K-means, is used to group similar feature vectors. At step 540, the sequence of multimodal feature vectors is classified according to their closest cluster labels to produce a first segmentation.

At step 550, a maximum and minimum window filtering operation is performed (i.e. dilation and erosion operations) to eliminate spurious short segments and fill in short gaps, ensuring the output meeting phases are consistent segments observing, for example, a minimum duration threshold, such as 30 seconds.

Phase indicators are generated at step 560 using the results of the filtering operation. In this regard, the phase indicators include temporal boundaries of the phase and labels indicative of the participant(s) speaking, topics/concepts discussed, and sentiment during each phase.

Figure 6:
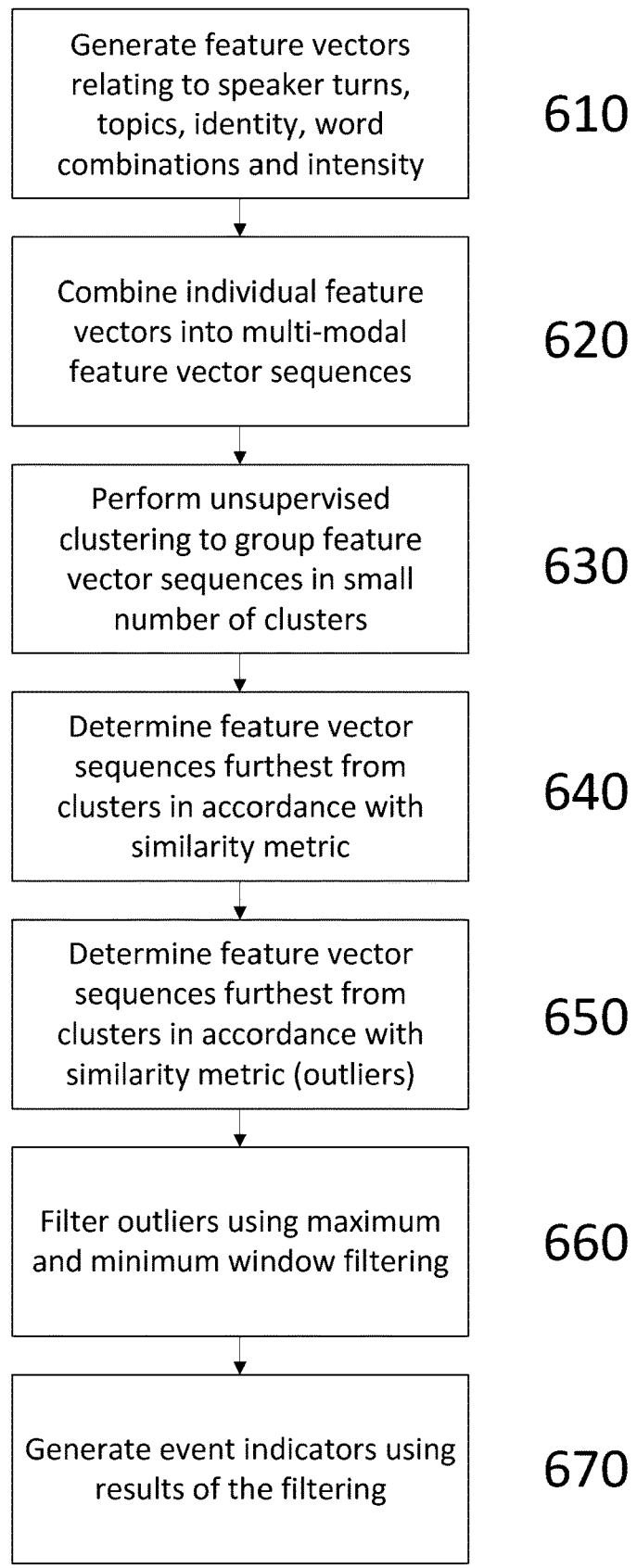
FIG. 6 is a flowchart of a further example of a method of generating one or more event indicators.

An additional example of a method of generating one or more event indicators indicative of events in a meeting will now be described with reference to FIG. 6. In this example, the event indicators are indicative of outlier or anomalous variations from an average distribution which incorporates features such as change rate of speaking turns, the number or type of keywords with high information content, the use of named entities, the use of particular word combinations, the sentiment of the words, voice intensity measured by pitch and speaking rate, and the identity or role of the participant speaking.

For example, an event detected in this regard may represent any of the following:
  a client expressing strong negative sentiment,
  someone assigning an action point to another member of the group,
  a point of agreement being reached by a team.

In any event, in this example at step 610 a number of feature vectors relating to the abovementioned parameters are generated, including speaker voice embedding vectors from a neural network, speaker labels from a first level speaker clustering, word embedding vectors from a neural network, named participant vectors, text-based sentiment vectors (e.g. [p(negative), p(neutral), p(positive)]), voice pitch, and speaking rate.

At step 620, the feature vectors are combined into a single multimodal feature vector sequence. Unsupervised k-means clustering is used to group similar feature vectors into a small number of clusters at step 630. In this regard, k may be selected as a smaller number (for example, between about 2 and 5) depending upon meeting duration. This can ensure that meeting features are classified according to a small number of clusters which should be indicative of average or normal behaviour. In this regard, outliers would tend to represent feature vectors which are sufficiently different to average, without being overclassified into a cluster of their own. In other examples, selection algorithms may be used to determine k, such as the "elbow method", "silhouette analysis" or the like.

At step 640, outliers are detected by labelling feature vectors that are furthest from the abovementioned clusters according to a similarity metric. As will be appreciated, any suitable similarity metric may be used, including for example cosine similarity, Euclidean distance, Mahalanobis distance, or the like.

At step 650, a maximum and minimum window filtering operation (i.e. dilation and erosion operations) is performed to reduce spurious, for example short, outliers and fill in short gaps. This may be achieved, for example, by ensuring the outliers are consistent over a minimum duration, such as 3 seconds, and less than a maximum duration typical of a longer phase, such as 30 seconds.

Using the results of the filtering, the event indicators are determined at step 670 in accordance with the filtered outliers. In this regard, event indicators typically include temporal boundaries/instances, and labels relating to the participant(s), subject/topic, etc.

The above example is illustrative and does not restrict the invention covering other cue combinations, any choice of unsupervised clustering (e.g. Gaussian mixture model, Dirichlet mixture model), supervised classification method (e.g. Gaussian mixture model, neural network, support vector machine, etc), or rule-based classifier (such as an expert system coded by observers, operators or the like) for the first label segmentation or any other method to produce the final smoothed segmentation including hidden Markov model, particle filtering, state machine, etc.

In particular, the above example specifies the detection of a generically significant moment, in which significance is defined as some cue behaviour that is different to the average cue behaviour. This may have inherent utility for a user interested in rapidly finding the most distinctive events of a meeting.

A supervised classification into specific meeting event types may be done if a suitable data set is available. This data may for example contain labelled times when action items events or decision events occur in a large set of meetings. In one example, labelled data may be initially obtained in accordance with operator input (e.g. an operator or expert labelling meeting signals, for example), and the labelled data may be dynamically updated by incorporating the results of subsequent automated or semi-automated classifications. In this case, the above unsupervised k-means clustering and exception detection 630 to 650 may instead be replaced by a supervised classifier or rule-based system trained to specifically detect action items or decisions directly from the multimodal feature vector sequence.

Figure 7:
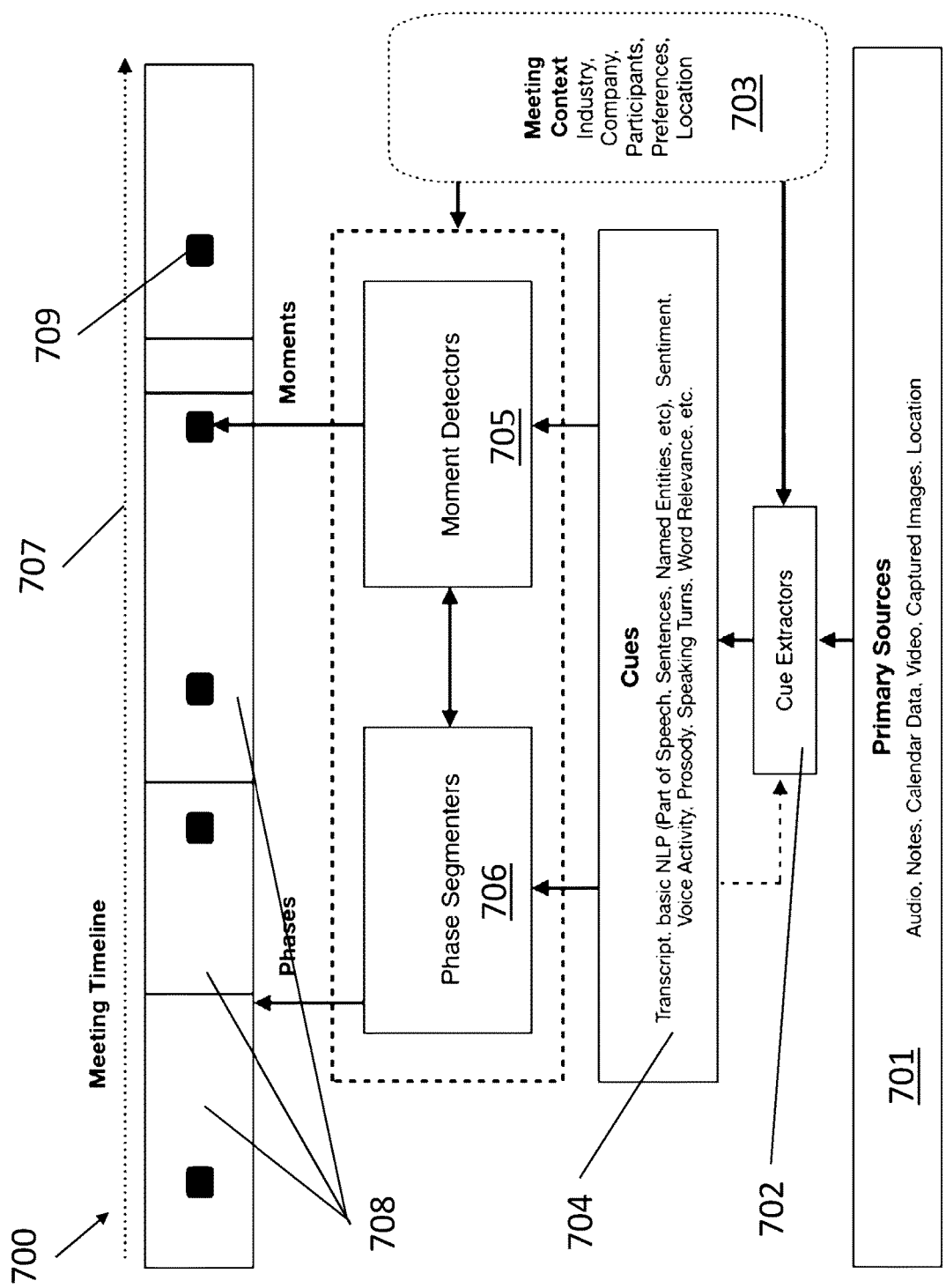
FIG. 7 is a schematic of a further example of a method of visualisation of a meeting.

A further example of displaying or visualising information relating to a meeting between participants will now be described with reference to FIG. 7.

In this example, the process 700 includes retrieving data/signals from a number of sources 701 (referred to as "primary sources" in this example). These are typically multimodal in nature, containing the various signals and data sources that are associated with a meeting. These may include one or more audio signals, calendar event data, user data entered via an interface, one or more video signals, etc.

The primary sources 701 are input into numerous feature extractors, referred to as cue extractors 702 in this example. Cue extractors 702 derive higher-level information from the sources as well as other cues. The cue extractors 702 typically use a variety of technologies, including digital signal processing, natural language processing and machine learning to infer the cues from the sources. The cue extractors 702 may include proprietary algorithms or third-party external services, such as a commercial speech-to-text API. Some cue extractors 702 may build upon both primary sources as well as other derived cues, such as a multimodal sentiment extractor that uses the primary audio signal as well as the derived transcript.

The output of the cue extractors is the set of features, also referred to as cues 704 in this example. Such cues 704 may for instance include words spoken in the audio signal, sentiment, speaking turn information, topics or semantic concepts in the spoken text or documents, etc. As these cues 704 have been extracted automatically from a variety of sources, they typically represent imperfect information due to any inherent inaccuracies of the extractors 702. For instance, state-of-the-art speech to text from multiple participants conversing in a meeting may have an expected word error rate (WER) of 10%. The cues 704 are therefore individually considered as "noisy" information.

Some typical primary sources 701 that the system may use, and the associated cues 704 that may be extracted from them, include:

| Primary Source | Potential Secondary Cues |
| --- | --- |
| Audio signals | Audio quality, speech words, speaker voice, speaking turns, sentiment, prosody, environment/noise, meeting phases |
| Calendar data | Time, attendees, user text, attached documents, URLs, location |
| User input | Tag/action button clicks, user text, key times |
| Documents (e.g. agenda, other) | Topics, related concepts, organisational context |
| Images | Notes and diagrams from whiteboard, text from documents scanned in meeting. |
| Video signals | Gestures, Attendees, environment, use of artefacts |

The set of cues 704 is classified and segmented to extract two different high-level types of information from the meeting, namely meeting phases 708, and meeting events 709.

Phase segmenters 706 take the set of noisy cues 704 and perform supervised or unsupervised classification to determine a temporal segmentation into the identified classes, in this example referred to as meeting phases 708. Classification may be performed using any one of a variety of classification methods known in the art, including, for example, rule-based, supervised machine learning classifiers such as neural networks (including recurrent, convolutional, etc), Gaussian mixture models, hidden Markov models, support vector machines, unsupervised clustering methods as k-means, spectral clustering, and the like. In addition, temporal segmentation into classes may be performed using well-known techniques such as Hidden Markov Models, state machines, temporal filters, etc.

Meeting phases 708 divide an entire meeting 707 into a contiguous sequence of segments that are internally coherent in terms of cues. In this example, they represent a span of time within the meeting 707. For instance, a segment with two people speaking about a particular topic may show consistent patterns in the speaker turn cues as well as semantic concepts, and hence may be represented in a summarised form as a single meeting phase 708. In one instance, these meeting phases 708 may represent an exhaustive and mutually exclusive segmentation of the meeting. However, more generally, there may be some degree of temporal overlap between phases. In some instances, meeting phases 708 may loosely correspond to items in a traditional meeting agenda, but this is not essential.

Event or moment detectors 705 take the set of noisy cues and perform supervised or unsupervised classification on them to detect events of significance. Classification may be performed using any one of a variety of classification methods that are known in the art, including rule-based or machine learning classifiers such as neural networks (including recurrent, convolutional, etc), Gaussian mixture models, hidden Markov models, support vector machines, and the like.

Meeting events 709 represent times within a meeting 707 or meeting phase 708 when something significant happened. An obvious example of such an event may be the time that a decision was verbalised, or an action item assigned to a participant. The definition of significance here is however intended to be less prescriptive and allow more general interpretation, such as times of particularly high or low sentiment, or when key information was stated (such as names or performance metrics), or a question asked by a prominent participant. While events 709 are of typically shorter duration than phases 708, they usually have some associated temporal duration for the core event 709 as well as closely related context before or after the event.

Significance can be a user-dependent concept, differing across meeting context 703 which may include industries, companies, professions, geographical location and meeting types. The important vocabulary and relevance of different phases 708 or events 709 will vary according to this meeting context 703, and so they are typically provided as side information into the cue extractors 702, the phase segmenters 706 and the event detectors 705. For example, a user in the finance industry may have particular statements they need to make in client meetings for compliance reasons, and so an event detector 705 may be used to indicate when these occur. As another example, a company may require staff to follow a particular discussion template when conducting client conversations, and so information about this template may provide information to a phase segmenter 706 to find phases of significance to that company.

The abovementioned example may be incorporated into an information compression and indexing system. Organising the meeting record into a sequence of phases 708 with significant events 709 facilitates compression of the meeting information for more efficient consumption by a user. For a given meeting, phases 708 and events 709 represent the top layer of a hierarchy that can optionally be progressively expanded by a user in the event they seek to dive into particular details of phases 708 or events 709 of significance to them. For example, from a compressed view of the phases 708 and events 709, a user may search or navigate to a decision event towards the end of a discussion phase. They may then expand that phase 708 of the meeting to view cues 704 such as the topics or sentiments expressed, or read the full transcript, or simply listen to the audio signal capturing the discussion that lead up to that decision.

This organising or indexing of meeting content into phases 708 and events 709 also advantageously facilitates the extraction of relevant content when searching across an archive of many meeting recordings, enabling the search to be targeted, for example, for meetings when a particular person presented on a given topic, or conversations with events of significantly negative sentiment expressed by a client.

Figure 8:
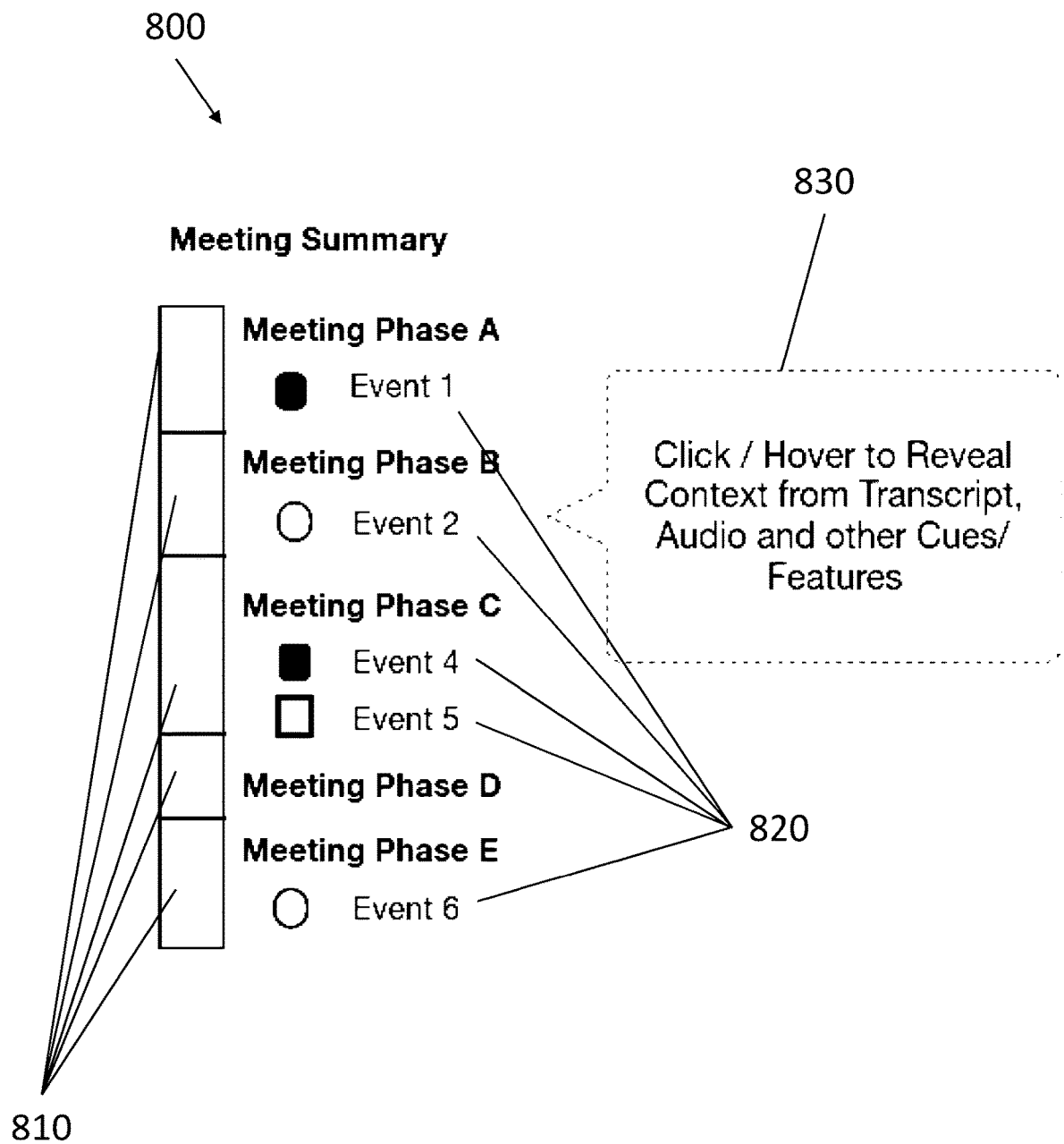
FIG. 8 is a schematic of an example of a representation indicative of phase indicators and event indicators.

An example of a representation indicative of phase indicators and event indicators will now be described with reference to FIG. 8.

In this example, the representation of the meeting includes graphical phase indicators 810 which depict the timeline of the meeting in a vertical bar. Colour coding in the vertical phase indicators 810 is indicative of respective phases in the meeting. Textual phase indicators are also included, and in this example state "Meeting Phase A", "Meeting Phase B", etc. As described above, any suitable text could be used, including a topic or concept discussed in that phase, or the like.

Moment or event indicators 820 are also included in the representation, including graphical colour coded indicia and text descriptors, namely "Event 1", "Event 2", etc. The event indicators 820 are posited in respect of the meeting timeline defined by the phase indicators 810, such that it can be readily understood when the respective events occurred during the meeting. Moreover, in some examples the particular colour of the indicia reflects the type of event, such as a highlight, action point, particularly significant sentiment, or the like. Optionally, the text labels "Event 1", "Event 2", etc could be used instead to provide a further descriptor of the event, such as the topic, discussion point, participant involved, etc. For example, for an action point, the text descriptor may state the participant and action assigned, e.g. "Dani to handle recruitment".

The representation 800 also includes a notice 830 that users are able to interact with the indicators 810, 820 in order to reveal further detail, such as associated features, cues, transcripts, etc. In this regard, user input such as a mouse click, user touch, or hover may cause features relating to the selected indicator to be further displayed. This will be described in more detail below. In some examples, the features, cues and/or transcript associated with the selected indicator(s) 810, 820 may be detected and displayed in accordance with a temporal value or time associated with the indicator.

Figure 9:
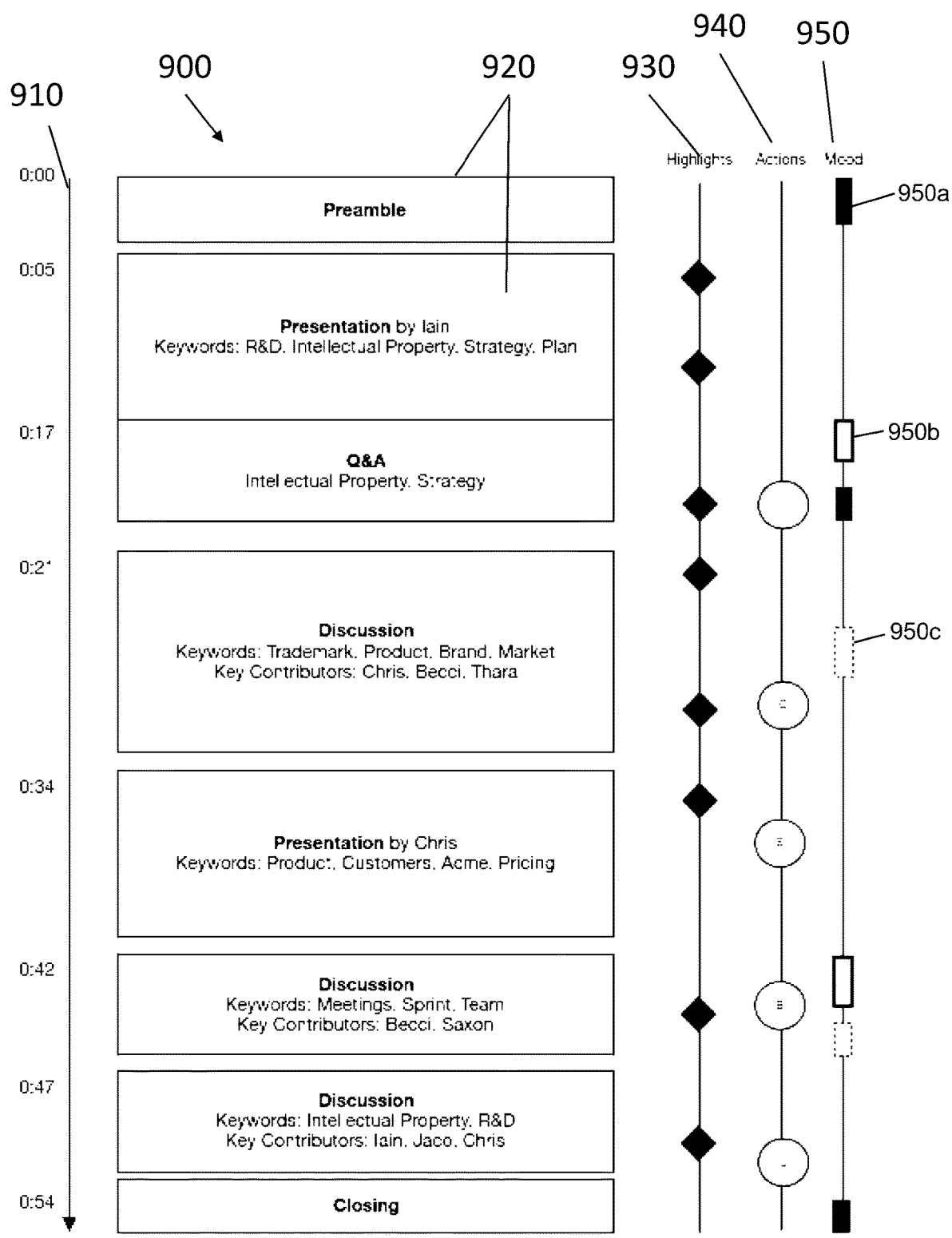
FIG. 9 is a schematic of a further example of a representation indicative of phase indicators and event indicators.

A further example of a representation indicative of phase indicators and event indicators will now be described with reference to FIG. 9.

In this example, a meeting timeline 910 is included in the representation, with labels indicative of the start time of each respective phase 920. Meeting phases 920 are included as colour coded indicia in line with the meeting timeline, where colours are representative of the type of meeting phase, for example preamble, presentation, question and answer (Q&A), discussion, etc. Furthermore, the meeting phases 920 incorporate summary keywords relating to the phase (e.g. research and development, intellectual property, etc) and the identities of key contributors.

In line with the meeting timeline 910 are three different event timelines which are representative of different event types, namely highlights 930, actions 940, and mood 950. In this regard, highlights 930 includes coloured diamonds to indicate respective times in which significant highlights of the meeting occurred. Actions 940 indicate at which points in the meeting actions were discussed and assigned, and these are also coded with a respective letter, which could be used for ease of reference.

Mood 950 in this example is also indicative of times in the meeting in which sentiment was significant or deviated substantially from the average. The colours provide a traffic light colour coding to indicate whether the mood event 950 was positive (green) (950*a*), particularly negative (red) (950*b*) or unusually neutral (amber)(950*c*).

In this regard, richer rendering of interactive meeting summaries may also include relevant context from secondary cues or features, such as discussed above, like keywords, speaker identity or sentiment. This can facilitate more efficient navigation of the meeting, including to a particular phase or event that is relevant to a user's task, or allow a user(s) to rapidly form an understanding of a meeting they did not attend.

Figure 10:
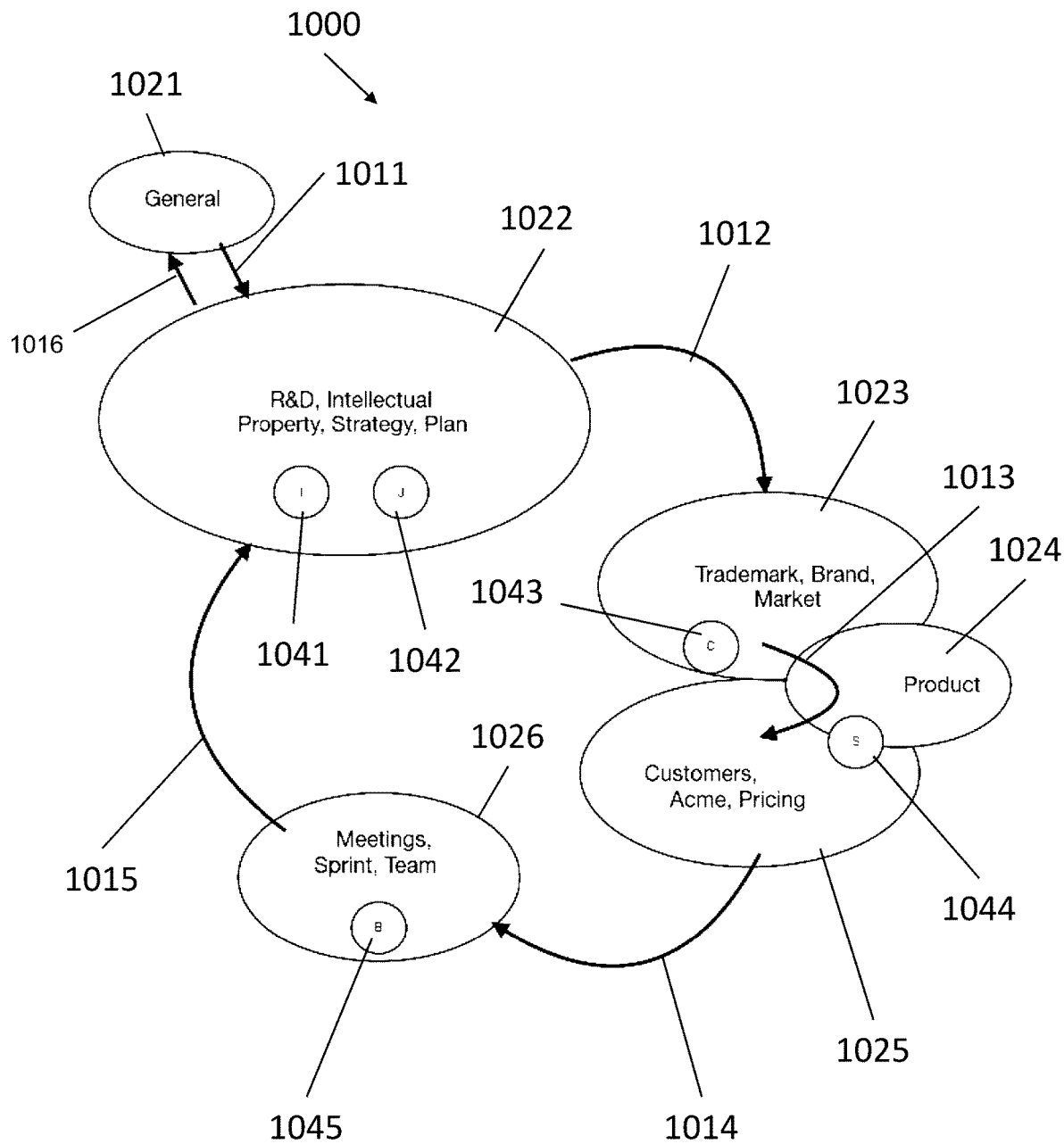
FIG. 10 is a schematic of a further example of a representation indicative of phase indicators and event indicators.

A further example of a representation indicative of phase indicators and event indicators will now be described with reference to FIG. 10.

A meeting 1000 does not necessarily need to be presented as a temporal sequence. Accordingly, the representation 1000 shown in FIG. 10 includes arrows as indicators of how a meeting transitioned between phases with related concepts.

In this representation, phases 1021, 1022, 1023, 1024, 1025, 1026, are defined by coloured ovals where arrows 1011, 1012, 1013, 1014, 1015, 1016 define the temporal sequence between the phases 1021, 1022, 1023, 1024, 1025, 1026. In this regard, the size of the phases 1021, 1022, 1023, 1024, 1025, 1026 is indicative of the time spent in each phase 1021, 1022, 1023, 1024, 1025, 1026. Keywords labels are also included as text indicators in each phase 1021, 1022, 1023, 1024, 1025, 1026.

Events 1041, 1042, 1043, 1044, 1045 are included as coloured indicia in each phase, indicating in which phase 1021, 1022, 1023, 1024, 1025, 1026 they occurred.

Figure 11:
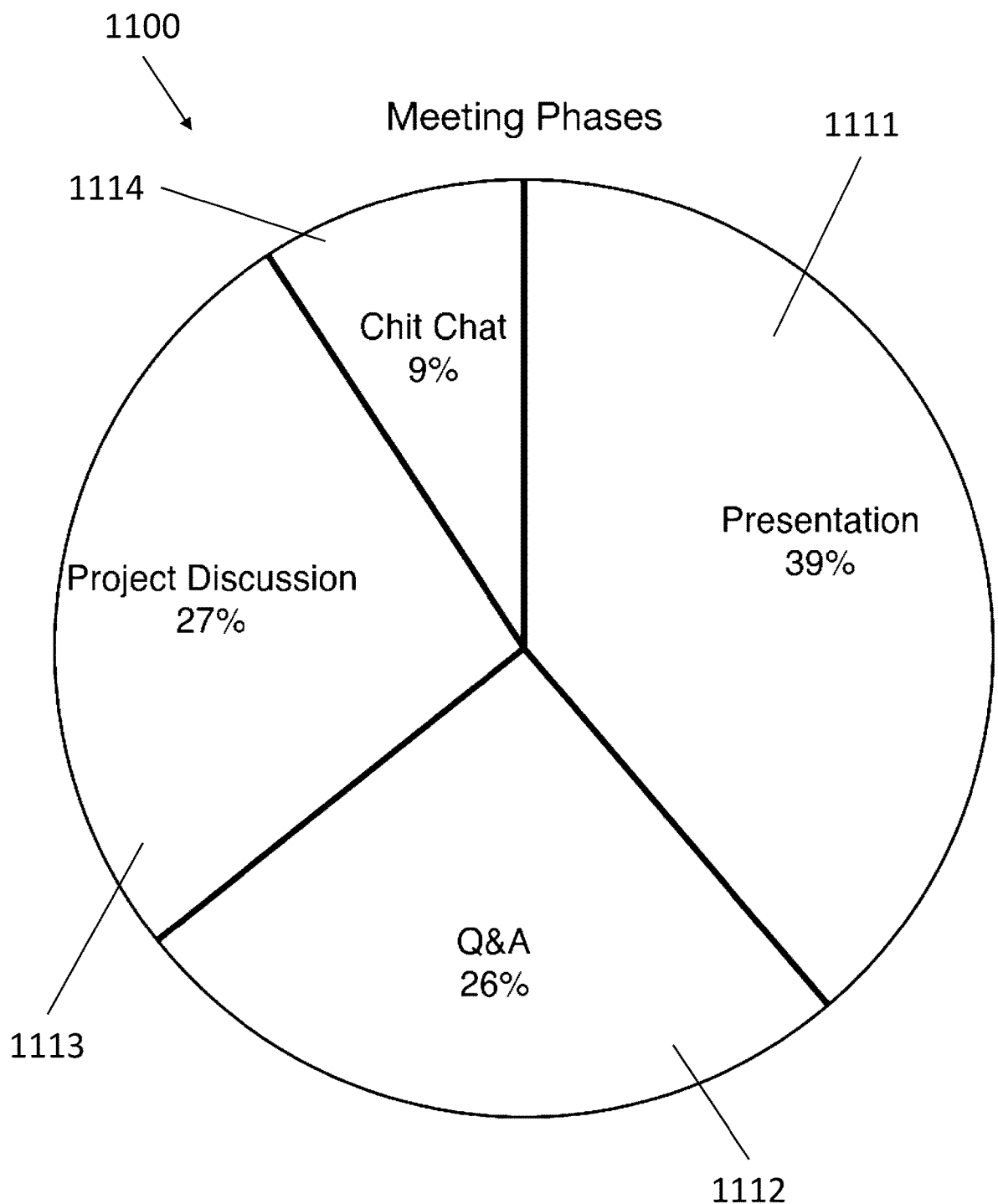
FIG. 11 is a schematic of a further example of a representation indicative of phase indicators.

A further example of a representation indicative of phase indicators will now be described with reference to FIG. 11. In this example, the representation 1100 includes a pie chart showing relative amounts of time spent in different meeting phases 1111, 1112, 1113, 1114.

A further example of a representation indicative of phase indicators and event indicators will now be described with reference to FIG. 12. In this example, the representation 1200 includes a meeting timeline 1210 which is aligned horizontally. Colour coding along the timeline 1210 is indicative of respective meeting phases 1221, 1222, 1223, 1224, 1225, and audio signal amplitude is included on the timeline as a grey silhouette indicative of the level of participation. Meeting events 1241 are also included on the timeline 1210 to indicate when they occurred.

A meeting summary is provided below the meeting timeline 1210, which in this instance includes events 1241, 1243, 1242 sorted by event type, namely actions, decisions, questions, and interests. In this example, the event indicators 1241, 1243, 1242 are coloured according to their respective type. In addition, a text summary of the events 1241, 1243, 1242 is displayed, including any relevant participants, and a descriptor.

Figure 12:
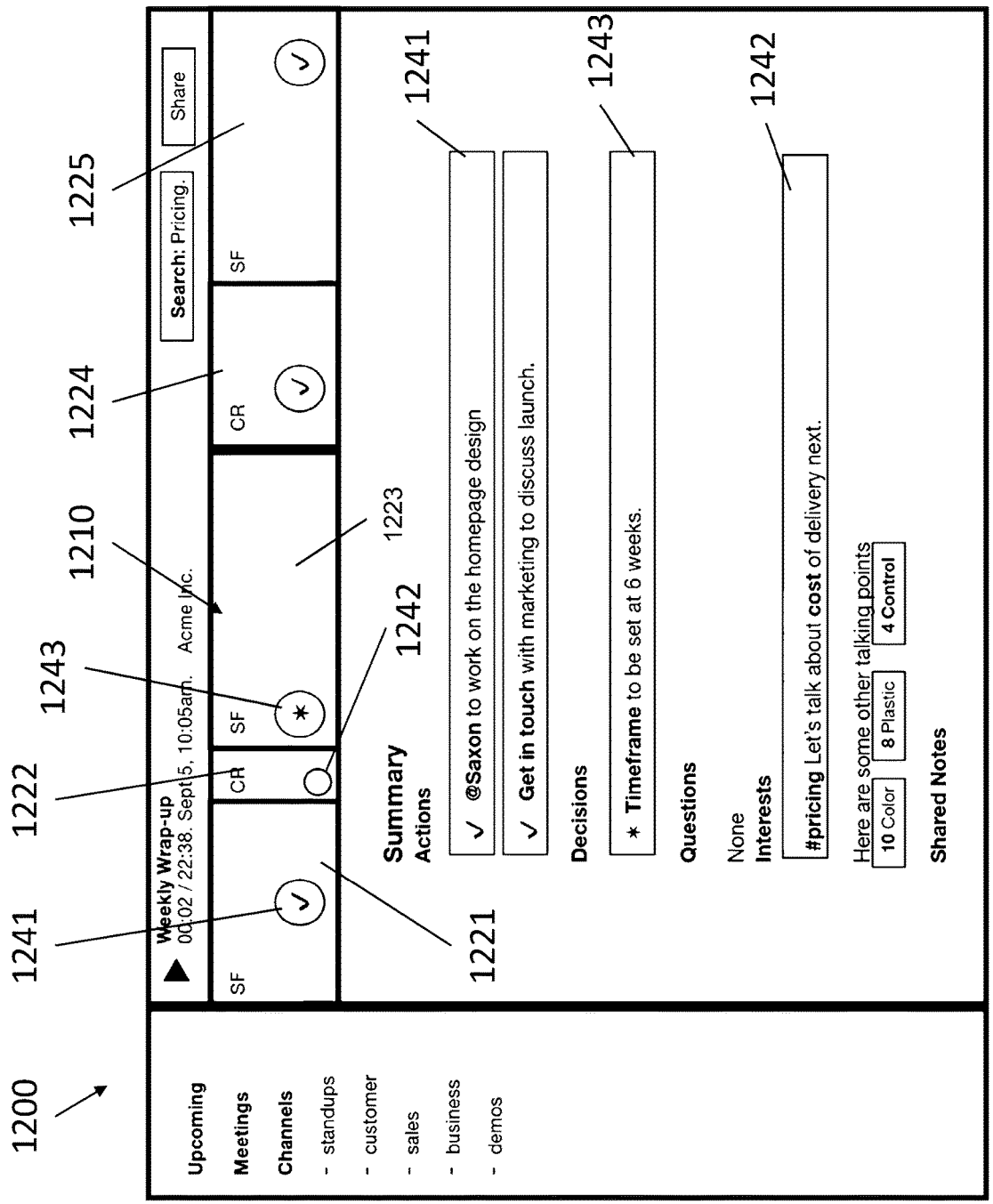
FIG. 12 is a schematic of a further example of a representation indicative of phase indicators and event indicators.
Figure 13:
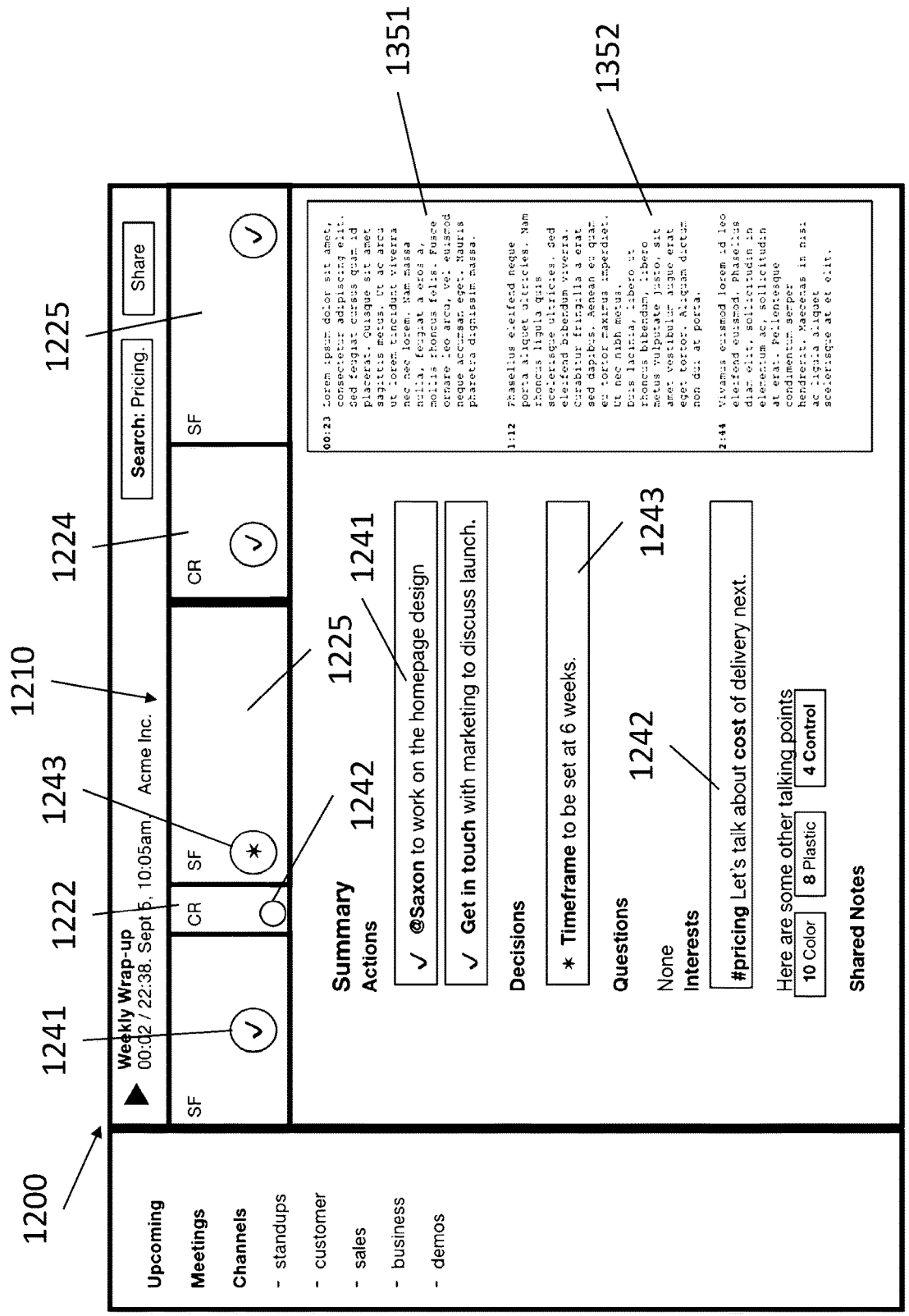
FIG. 13 is a schematic of the example of FIG. 12 including graphical indications indicative of features; and, FIGS. 14a and 14b are flowcharts of a further example method of generating event indicators.

As shown in FIG. 13, the representation of FIG. 12 can be supplemented with features relating to phases and/or events, such as subsections of the meeting transcript 1351, 1352.

Alternatively, a textual representation of the meeting may be included in a representation, which includes a summary of phases and events. For example, an abstractive text representation of a meeting may include:

> The meeting opened with a presentation by Iain about Intellectual Property, Strategy and an R&D Plan. In subsequent Q&A, there were some disagreements with the plan, but these were resolved and a follow-up action for Iain to revise the plan. General discussion lead by Chris, Becci and Thara then focused on Product, Brand and Trademark issues. Chris gave a brief presentation on customers including Acme and assigned an action to Saxon to review pricing for the product. Saxon raised issues about problems with team meetings at the start of each sprint which Becci agreed to resolve, and then Iain, Chris and Jaco reviewed some points related to the earlier discussion of R&D and Intellectual Property. The team were in general agreement and the meeting was closed.

Figure 14A:
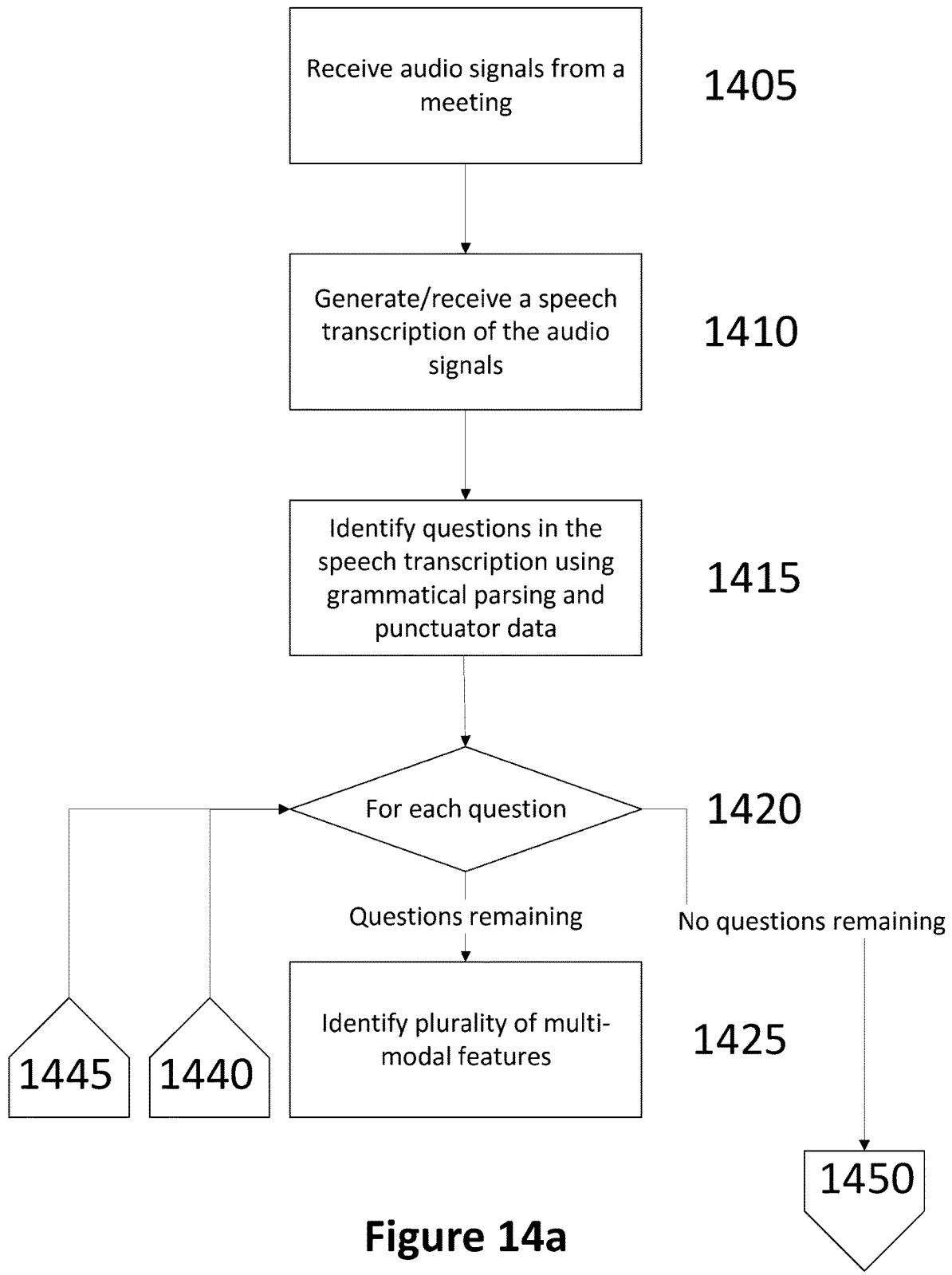
Figure 14B:
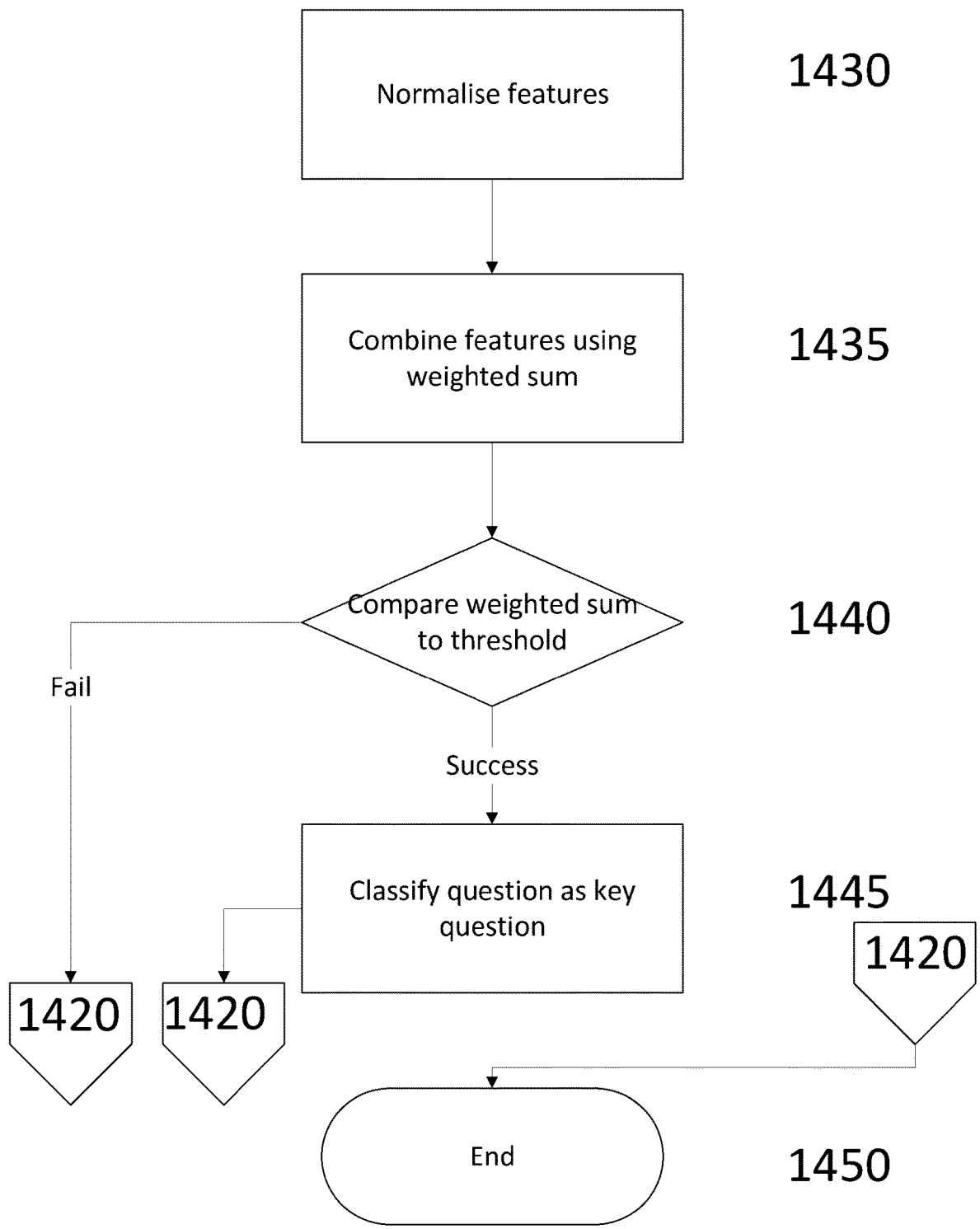

A further example of generating one or more event indicators relating to a meeting or meetings between participants will now be described with reference to FIG. 14. In this example, the event indicators relate particularly to key questions raised in a meeting. This can be particularly beneficial as the inventors have determined that strong questions can often mark key moments in a meeting, particularly for client-facing business meetings. For example, from a professional to a client, key questions can be used to gather key requirements and make clarifications, while from a client to a professional, questions may seek to clarify points which the client cares most about. Thus, by identifying key questions, this enables an operator—such as the professional or client—to navigate to, or display, elements of the meeting which are particularly pertinent for their purposes.

In this example, at step 1405 the method includes determining audio signals indicative of the meeting between one or more participants. As discussed in relation to examples above, this may be achieved in any suitable manner including causing the audio signals to be sensed and/or receiving the audio signals from a memory store or remote processing device.

The speech transcription of the above audio signals is either generated or determined at step 1410. This could, for example, include receiving a corresponding speech transcription which has, for example, been manually transcribed by an operator. Alternatively, the speech transcription may be generated automatically and/or semi-automatically from the audio signals, for example using techniques or software known in the art, including third party and/or commercially available software or the like.

At step 1415, the resultant speech transcript is used to identify questions raised during the meeting, and this is done using grammatical parsing of the transcript and punctuator data extracted from the transcript.

For each identified question, at step 1420, classification of "key" questions is undertaken. In this regard, at step 1425, a set of multi-modal features is calculated/generated using the audio and/or transcript relating to the respective one of the questions, such as one or more of:

keyword density within the question;
keyword density in N words preceding the question;
keyword density in N words following the question;
probability of positive or negative sentiment;
a count of key phrases indicating directed questions—for example, such a phrase may proceed in a manner such as "can/should <subject><verb>", such as "can you do".
As another example, "when can <subject><verb>", such as "When can we meet", and in a further example "Did <subject><verb past tense>", such as "Did you finish . . . " and the like;
a count of emphasis words;
a count of a directed subject in the question—e.g. I, you, we, etc.;
a count of person names in the question;
slope of vocal pitch over the question;
speaking rate; and,
speaking turn change points—e.g. occurrence of a change in speaker directly following the question.

In this regard, predetermined variables such as "N" can be determined in any suitable manner including as a result of user input, derived from a population analysis, dynamically generated, etc. In addition, keywords, emphasis words, and/or key phrases may also be defined in any suitable manner such as described in any of the examples herein, including as a result of user input, derived from a population analysis, determined using meeting parameters, including organisational context, meeting type, etc, and/or other feature extraction methods.

At step 1430, each of the multi-modal features generated are normalised with respect to an expected distribution over the meeting (or meetings), in order to generate a probability score in accordance with each feature which typically ranges between 0.0 and 1.0. For example, in respect of the keyword density within the question, this could be normalised with respect to the average keyword density in the meeting.

The probability scores of each of the multimodal features associative with the respective question are combined at step 1435. While any suitable method of combining may be used, in this example a weighted sum is calculated using the probability scores. The respective weights of the sum could, for example, initially be selected via trial and error to give a score that correlates well to human perceived importance of the questions. As more data is gathered, however, the weights may be dynamically learned or updated, in order to optimise the proportion of key questions that a user deems useful/significant. Capturing whether the user agrees that a particular question is a key question or not could be achieved using any suitable mechanism, such as through thumbs up/thumbs down feedback. In some examples the weights may be dynamically updated according to a reinforcement learning algorithm or the like, with rewards based upon user feedback.

The weighted sum for the respective question is compared with a threshold at step 1440. The threshold can be determined in any appropriate manner. In one example, the threshold may be arbitrarily chosen and dynamically updated. For example, the arbitrary initial threshold could include the more confident key questions, for example with a threshold of 0.9 such that only questions with a weight sum higher than 0.9 are shown. Alternatively, the threshold may be selected in accordance with some desired top percentile (e.g. top 5% of questions in a meeting are key questions) or else trained on a dataset to achieve some target number of events per meeting duration (e.g. 5-10 key questions per hour). In a further instance, the threshold may be determined by utilising user feedback to dynamically update and/or optimise the threshold, for example, to optimise the proportion of key questions a user finds useful in accordance with some kind of user input (e.g. thumbs up/thumbs down user feedback).

If the comparison is successful, the question is classified as a key question at step 1445, thus indexing the question as an event. Otherwise, if unsuccessful, the question is not classified as a key question. The process continues at step 1420 until all questions are classified and ends at step 1450.

Accordingly, the key questions can subsequently be used to display a representation of the meeting, according to any of the examples herein. Alternatively, the key questions may be used to compress and/or index the audio signals or speech transcription. In one instance, an operator may use the temporal location of the key questions to navigate to just to those portions of the audio signals (or speech transcription) of the meeting, in order to get a sense of key requirements and key points requiring clarification, for example, In any event, the above describes a method of displaying, compressing and/or indexing numerous signals and/or data relating to a meeting(s). Beneficially, the process facilitates rapid understanding of a meeting or multiple meetings using a displayed representation which includes phase indicators which include a sequence of internally coherent temporal phases, and event indicators, which include temporal outlier or anomalous events that occurred during the meeting. Additionally, or alternatively, indexing or compressing the signals in accordance with the phase and event indicators enables more efficient and accurate searching and analysis.

The appended claims are to be considered as incorporated into the above description.

Throughout this specification, reference to any advantages, promises, objects or the like should not be regarded as cumulative, composite and/or collective and should be regarded as preferable or desirable rather than stated as a warranty.

Throughout this specification, unless otherwise indicated, "comprise," "comprises," and "comprising," (and variants thereof) or related terms such as "includes" (and variants thereof)," are used inclusively rather than exclusively, so that a stated integer or group of integers may include one or more other non-stated integers or groups of integers.

The term "and/or", e.g., "A and/or B" shall be understood to mean either "A and B" or "A or B" and shall be taken to provide explicit support for both meanings or for either meaning.

Where a method is defined as a series of steps, those steps need not be consecutive, unless the wording indicates otherwise.

Persons skilled in the art will appreciate that numerous variations and modifications will become apparent. All such variations and modifications which become apparent to persons skilled in the art, should be considered to fall within the spirit and scope that the invention broadly appearing before described.

Thus, for example, it will be appreciated that features from different examples above may be used interchangeably where appropriate.

The invention claimed is:

1. A method of visualising a meeting between one or more participants on a display, the method including, in an electronic processing device, the steps of:
   a. determining a plurality of signals, each of the plurality of signals being at least partially indicative of the meeting, and including audio signals captured during the meeting;
   b. generating a plurality of features using the signals;
   c. generating at least one phase indicator extracted from the plurality of features, the at least one phase indicator being indicative of a temporal segmentation of at least part of the meeting;
   d. generating at least one event indicator extracted from with the plurality of features, the at least one event indicator being indicative of a significant event during the meeting; and
   e. providing visualisation of the meeting by causing a representation indicative of the at least one phase indicator and/or the at least one event indicator to be displayed on the display, wherein
   the step of generating the at least one event indicator includes the step of training a supervised classifier on a labelled dataset using a neural network.

2. The method according to claim 1, wherein the plurality of signals includes a plurality of multi-modal signals.

3. The method according to claim 2, wherein the step of generating at least one phase indicator includes the steps of:
   a. generating a plurality of feature vectors wherein each feature vector is generated using a respective one of the multi-modal signals;
   b. generating a plurality of multi-modal feature vectors using the feature vectors; and
   c. classifying the multi-modal feature vectors.

4. The method according to claim 3, wherein the step of classifying the multi-modal feature vectors is carried out with at least one classifier is in the form of any one or more of:
   a. at least one hidden Markov model;
   b. at least one state machine;
   c. at least one temporal filter; and
   d. at least one of an erosion filter and a dilation filter.

5. The method according to claim 3, wherein classifying the multi-modal feature vectors includes making use of any one or more of:
   a. a supervised classification;
   b. an unsupervised classification;
   c. an expert rule-based classification;
   d. at least one rule-based classification;
   e. at least one neural network;
   f. at least one Gaussian mixture model;
   g. at least one hidden Markov model;
   h. at least one support vector machine;
   i. unsupervised k-means clustering; and
   j. spectral clustering.

6. The method according to claim 2, wherein generating at least one event indicator includes the steps of:
   a. generating a plurality of feature vectors wherein each feature vector is generated using a respective one of the multi-modal signals;
   b. generating a plurality of multi-modal feature vectors using the feature vectors;
   c. classifying the multi-modal feature vectors using the supervised classifier; and
   d. detecting outliers among the plurality of multi-modal feature vectors using the results of the classification.

7. The method according to claim 1, wherein generating the at least one event indicator includes the step of anomaly detection.

8. The method according to claim 1, wherein the method includes, in an electronic processing device, determining at least one event type associated with each event and wherein the representation is indicative of the event type, the event type including any one or more of:
   a. an action;
   b. a mood;
   c. a sentiment;
   d. a highlight;
   e. a question;
   f. recapitulation;
   g. a milestone; and
   h. an event type determined in accordance with user input.

9. The method according to claim 1, wherein the method includes, in the electronic processing device, determining at least one of:
   a. at least one phase parameter; and
   b. at least one event parameter, wherein the plurality of features is generated in accordance with at least one of the phase parameters and the event parameters.

10. The method according to claim 1, wherein the plurality of signals includes any one or more of:
    a. calendar data;
    b. user input;
    c. at least one document;
    d. at least one image signal; and
    e. at least one video signal.

11. The method according to claim 1, wherein the features are generated from the plurality of signals using any one or more of:
    a. at least one neural network;
    b. at least one clustering algorithm;
    c. at least one hidden Markov model;
    d. a filter;
    e. at least one transcription algorithm;
    f. at least one natural language processing algorithm; and
    g. at least one image recognition algorithm.

12. The method according to claim 1, wherein the method includes, in the electronic processing device, the steps of:
    a. determining at least one meeting parameter; and
    b. generating at least one of the at least one phase indicator and the at least one event indicator in accordance with the meeting parameter wherein the at least one meeting parameter is indicative of any one or more of:
       i. an industry;
       ii. a company and/or organisation;
       iii. at least one identity of the one or more participants;
       iv. one or more preferences; and
       v. a location.

13. The method according to claim 1, wherein the representation includes at least one temporal indicator indicative of a time range of the meeting.

14. The method according to claim 1, wherein the representation includes one or more of at least one graphical indication of at least one of the phase indicator and the event indicator, and at least one textual indication of at least one of the phase indicator and the event indicator.

15. The method according to claim 1, wherein the representation includes at least one transition indicator indicative of a temporal sequence of at least one of the at least one phase indicator and the at least one event indicator.

16. The method according to claim 1, wherein the method includes, in the electronic processing device, the steps of:
  a. receiving an input selection associated with at least one of the phase indicator and the event indicator;
  b. selectively updating the representation to include an indication of a respective one of the features associated with the selected one of the phase indicator and/or the event indicator; and
  c. causing the updated representation to be displayed.

17. The method according to claim 1, wherein the method includes, in the electronic processing device, the steps of:
  a. receiving an input selection associated with at least one of the phase indicator and the event indicator;
  b. selectively updating the representation to include an indication of a respective one or more of the plurality of signals associated with the selected one of the phase indicator and/or the event indicator; and
  c. causing the updated representation to be displayed.

18. An apparatus for visualising a meeting between one or more participants on a display, the apparatus including an electronic processing device that is configured for carrying out the steps of:
  a. determining a plurality of signals, each of the plurality of signals being at least partially indicative of the meeting, and including audio signals captured during the meeting;
  b. generating a plurality of features using the signals;
  c. generating at least one phase indicator extracted from the plurality of features, the at least one phase indicator being indicative of a temporal segmentation of at least part of the meeting;
  d. generating at least one event indicator extracted from the plurality of features, the at least one event indicator being indicative of a significant event during the meeting; and
  e. providing visualisation of the meeting by causing a representation indicative of the at least one phase indicator and/or the at least one event indicator to be displayed on the display, wherein
  the step of generating the at least one event indicator includes the step of training a supervised classifier on a labelled dataset using a neural network.

* * * * *